US009906765B2

(12) United States Patent
Qu et al.

(10) Patent No.: US 9,906,765 B2
(45) Date of Patent: Feb. 27, 2018

(54) TRANSMITTING DISPLAY MANAGEMENT METADATA OVER HDMI

(71) Applicant: DOLBY LABORATORIES LICENSING CORPORATION, San Francisco, CA (US)

(72) Inventors: Sheng Qu, San Jose, CA (US); Samir N. Hulyalkar, San Francisco, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 134 days.

(21) Appl. No.: 15/025,212

(22) PCT Filed: Sep. 30, 2014

(86) PCT No.: PCT/US2014/058260
§ 371 (c)(1),
(2) Date: Mar. 25, 2016

(87) PCT Pub. No.: WO2015/050857
PCT Pub. Date: Apr. 9, 2015

(65) Prior Publication Data
US 2016/0241829 A1 Aug. 18, 2016

Related U.S. Application Data

(60) Provisional application No. 61/886,026, filed on Oct. 2, 2013.

(51) Int. Cl.
*H04N 9/67* (2006.01)
*H04N 7/08* (2006.01)
(Continued)

(52) U.S. Cl.
CPC .............. *H04N 9/67* (2013.01); *G09G 5/006* (2013.01); *G09G 5/04* (2013.01); *H04N 7/0806* (2013.01);
(Continued)

(58) Field of Classification Search
CPC .......... G09G 2370/04; G09G 2370/12; G09G 5/006; G09G 5/04; H04N 21/4318;
(Continued)

(56) References Cited

U.S. PATENT DOCUMENTS 6,674,802 B2   1/2004  Knee
7,130,350 B1  10/2006  Rault
(Continued)

FOREIGN PATENT DOCUMENTS

CN   101743745    6/2010
CN   101933094   12/2010
(Continued)

OTHER PUBLICATIONS

SMPTE 319M-2000 Transporting MPEG-2 Recording Information through 4:2:2 Component Digital Interfaces.
(Continued)

*Primary Examiner* — Huy T Nguyen

(57) ABSTRACT

In an embodiment, a source video signal comprising reference code values and mapping function parameters for one or more mapping functions to map the reference code values to device-specific pixel values. The reference code values and the mapping function parameters are combined into first video frames in a first video signal format. The mapping function parameters represent DM metadata carried in the first video frames. Second video frames in a second video signal format are generated based on the first video frames in the first video signal format and a mapping between the first video signal format and the second video signal format. The second video frames are sent to a video sink device through the video link in an encoded video signal of the second video signal format.

24 Claims, 9 Drawing Sheets

(51) Int. Cl.
*H04N 21/431* (2011.01)
*H04N 21/4363* (2011.01)
*G09G 5/00* (2006.01)
*G09G 5/04* (2006.01)
*H04N 7/088* (2006.01)
*H04N 5/235* (2006.01)
*H04N 5/57* (2006.01)

(52) U.S. Cl.
CPC ....... *H04N 7/0887* (2013.01); *H04N 21/4318* (2013.01); *H04N 21/43632* (2013.01); *H04N 21/43635* (2013.01); *G09G 2370/04* (2013.01); *G09G 2370/12* (2013.01); *H04N 5/2355* (2013.01); *H04N 5/57* (2013.01)

(58) Field of Classification Search
CPC ....... H04N 21/43632; H04N 21/43635; H04N 7/0887; H04N 7/0806; H04N 5/2355; H04N 5/57; H04N 9/67
See application file for complete search history.

(56) References Cited

U.S. PATENT DOCUMENTS

| | | | |
|---|---|---|---|
| 8,743,291 B2* | 6/2014 | Li | G06T 5/009 345/603 |
| 2009/0161017 A1 | 6/2009 | Glen | |
| 2009/0184975 A1 | 7/2009 | Yao | |
| 2010/0289810 A1 | 11/2010 | Doser | |
| 2010/0303439 A1 | 12/2010 | Doser | |
| 2011/0064373 A1 | 3/2011 | Doser | |
| 2012/0314944 A1 | 12/2012 | Ninan | |
| 2012/0321273 A1 | 12/2012 | Messmer | |
| 2013/0076763 A1 | 3/2013 | Messmer | |

FOREIGN PATENT DOCUMENTS

| | | |
|---|---|---|
| CN | 102893602 | 1/2013 |
| EP | 1838083 | 9/2007 |
| JP | 2005-514873 | 5/2005 |
| JP | 2007-537620 | 12/2007 |
| JP | 2009-521840 | 6/2009 |
| JP | 2009-530977 | 8/2009 |
| JP | 2010-109794 | 5/2010 |
| WO | 03/069895 | 8/2003 |
| WO | 2013/076777 | 5/2013 |
| WO | 2015/050857 | 4/2015 |

OTHER PUBLICATIONS

Wagner R.E. "Fernsehen, Film and elektronische Medien-angekommen in der IT-Welt" Berlin, DE, vol. 62, No. 7, Jul. 1, 2008.

Chan, C.K, et al "Hiding Data in Images by simple LSB Substitution" Pattern Recognition, Elsevier, GB, vol. 37, No. 3, Mar. 1, 2004, pp. 469-474.

* cited by examiner

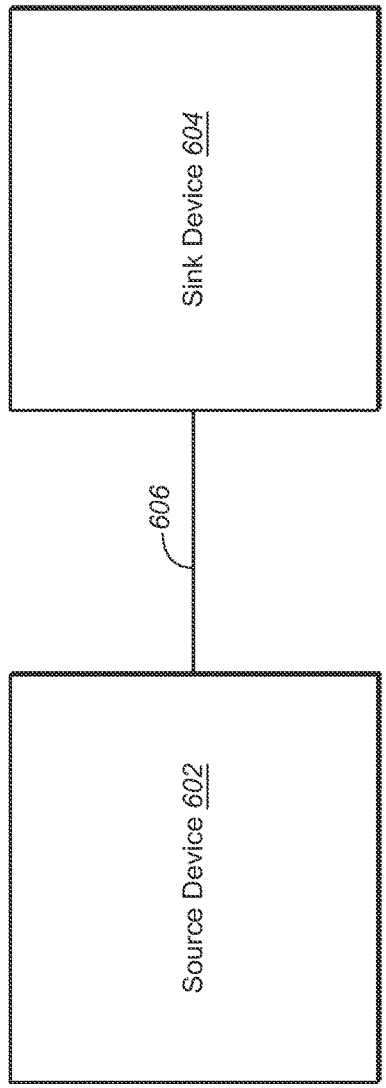
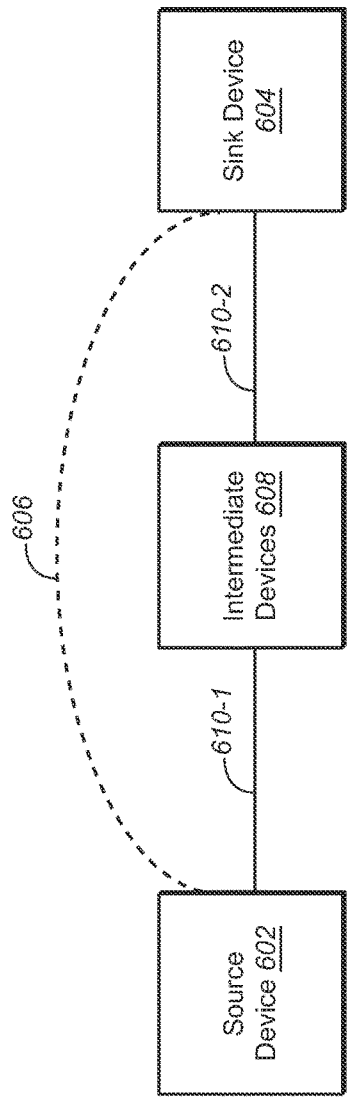
FIG. 6A
FIG. 6B

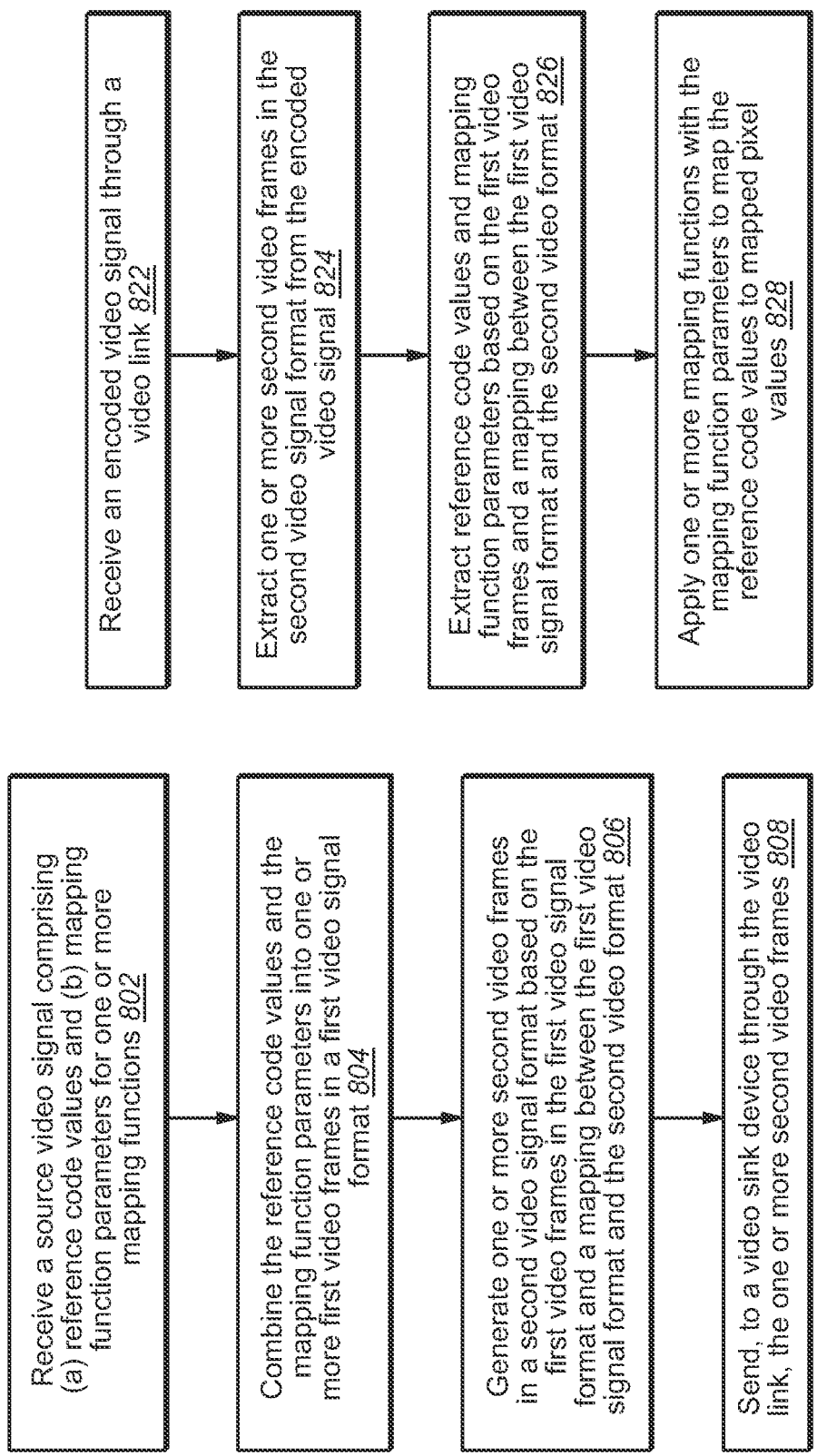

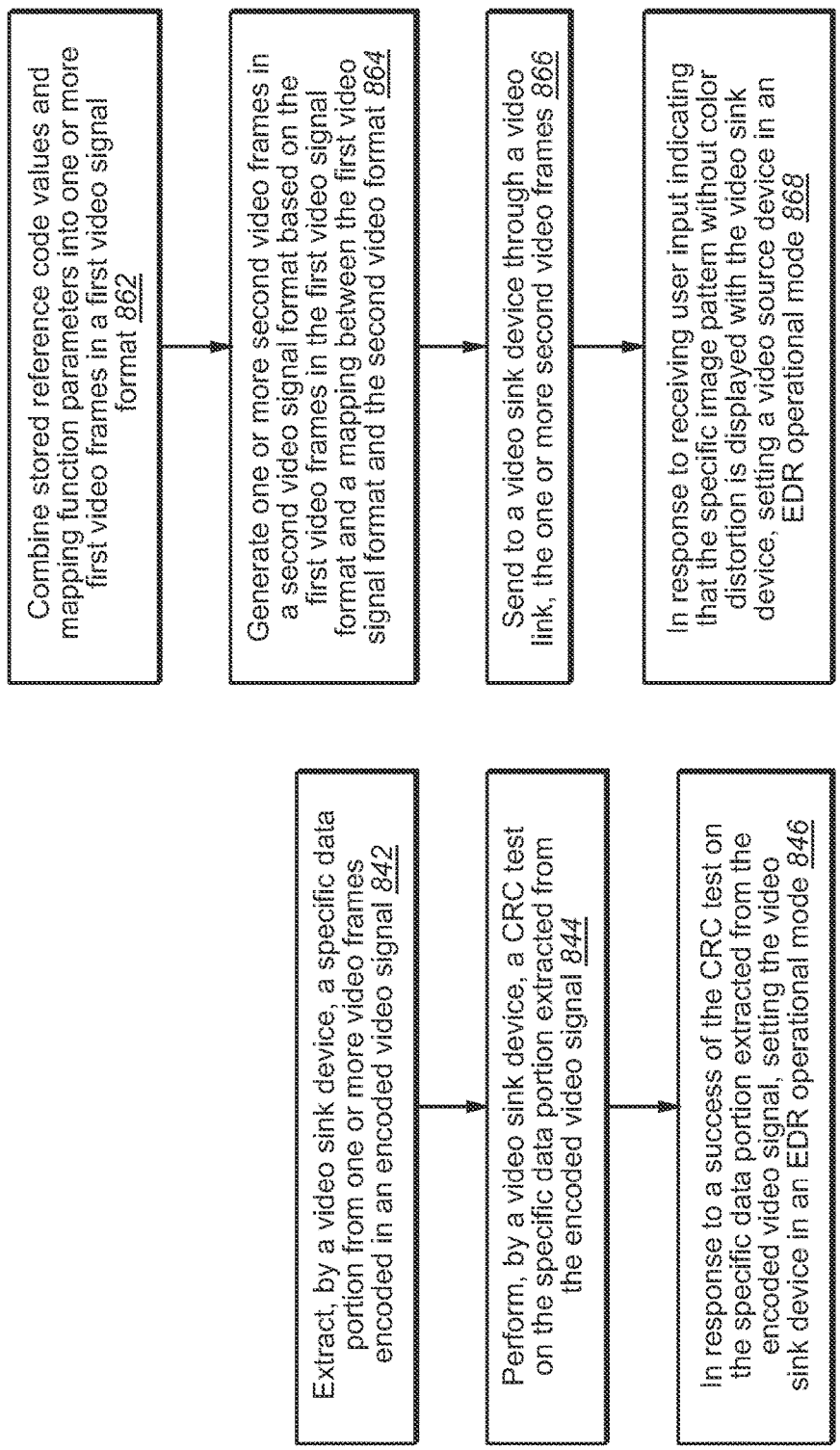

TRANSMITTING DISPLAY MANAGEMENT METADATA OVER HDMI

CROSS-REFERENCE TO RELATED APPLICATIONS

This application claims priority to U.S. Provisional Patent Application No. 61/886,026 filed 2 Oct. 2013 which is hereby incorporated by reference in its entirety.

TECHNOLOGY

The present invention relates generally to media processing systems, and in particular, to transmitting display management metadata over a video link.

BACKGROUND

Advances in technology allow display systems to render video source content with significant improvements in image quality characteristics. For example, some relatively modern displays are capable of rendering content with a dynamic range that is higher or even significantly higher than the standard dynamic range (SDR).

In contrast, some displays have a significantly narrower dynamic range than high dynamic range (HDR). Mobile devices, tablet computers, game devices, low-end televisions and computer monitors may be constrained in their video rendering capability in terms of dynamic range, color gamut and resolution.

Source images captured by HDR cameras may have a scene-referred dynamic range that is significantly greater than dynamic ranges of most if not all display devices. Scene-referred HDR images may comprise large amounts of data, and may be converted into post-production formats (e.g., HDMI video signals, etc.) for facilitating transmission and storage. As images are delivered to end users' display devices for rendering, device-specific and/or manufacturer specific image transformations occur along the way, causing large amounts of visually noticeable errors and degradations in rendered images in comparison with the original scene-referred images.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 6A and FIG. 6B illustrate example system configurations between a media source system and a media sink system;
FIG. 8A through FIG. 8D illustrate additional example process flows.

DESCRIPTION OF EXAMPLE EMBODIMENTS

Figure 1:
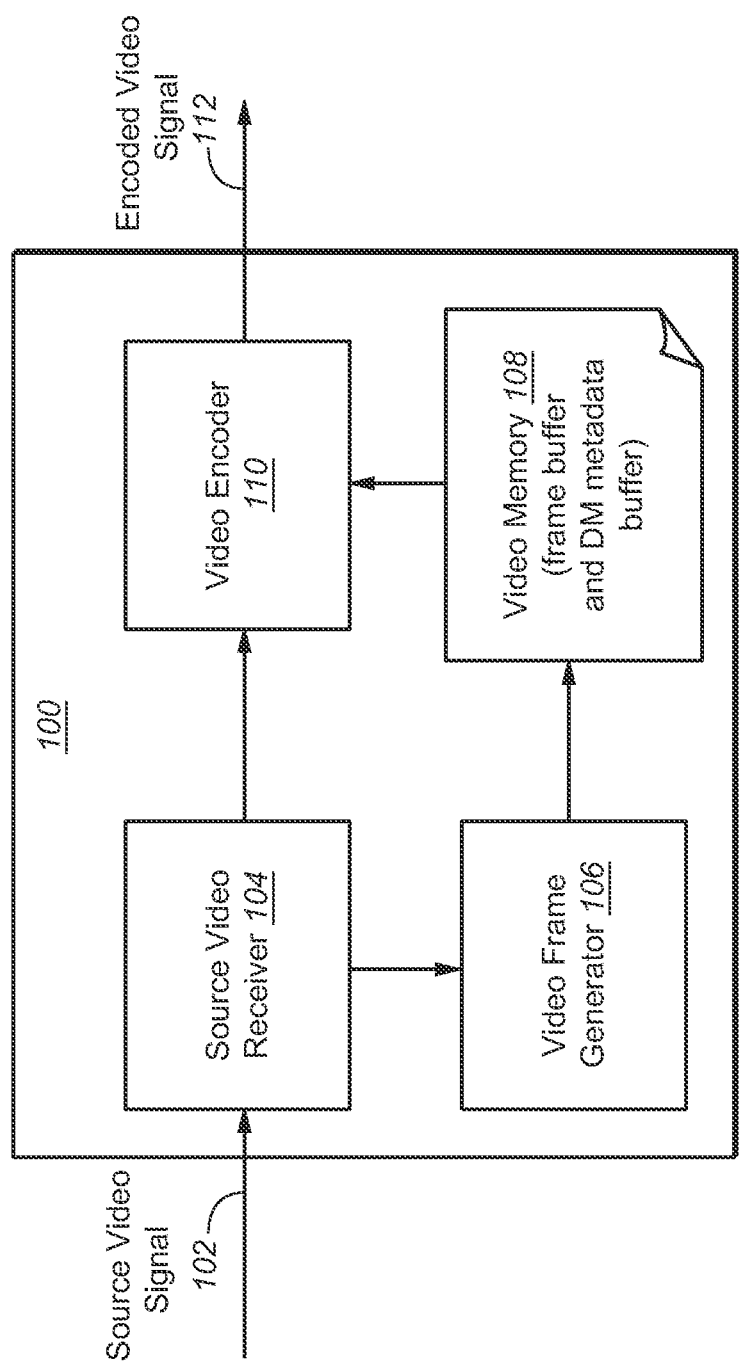
FIG. 1 shows a media source system.

Example embodiments, which relate to transmitting display management metadata over a video link, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. REFERENCE CODE VALUES AND MAPPED PIXEL VALUES
3. MEDIA SOURCE SYSTEM
4. MEDIA SINK SYSTEM
5. ALGORITHMS TO TRANSMIT AND RECEIVE DM METADATA
6. HDMI VIDEO LINKS
7. TUNNELING REFERENCE CODE VALUES AND DM DATA
8. NO EXPLICIT SIGNALING BETWEEN SOURCE AND SINK
9. CONFIGURING SOURCE FOR EDR OPERATION
10. EXAMPLE PROCESS FLOW
11. IMPLEMENTATION MECHANISMS—HARDWARE OVERVIEW
12. EQUIVALENTS, EXTENSIONS, ALTERNATIVES AND MISCELLANEOUS

1. General Overview

This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format, and should be understood as merely a conceptual prelude to a more detailed description of example embodiments that follows below.

Under techniques as described herein, source content of (e.g., scene-referred, etc.) high dynamic ranges, wide color gamuts, and high resolutions can be delivered in a source video signal, source video bitstream, source video file, etc., to downstream rendering devices as reference code values (e.g., code values in a reference dynamic range between a dark level and a maximum luminance level, code values code values in an extended dynamic range (EDR) under techniques developed by Dolby Laboratories, Inc. of San Francisco, Calif., etc.) with display management (DM) metadata over standard-based video links. The DM metadata in the source content can be used by each rendering device to map the reference code values in the source content to mapped pixel values for rendering on that rendering device in a manner that exploits the maximum capability of the rendering device. The DM metadata may comprise mapping parameters that represent lookup tables, mapping curves, mapping functions comprising piecewise line segments, pivot points for line or curve segments, etc.

In an example, the DM metadata can be used by a rendering device that supports a Rec. 709 dynamic range to map the reference code values to mapped luminance pixel values that fully exploit the Rec. 709 dynamic range supported by the rendering device. In another example, the DM metadata can be used by a rendering device that supports a Rec. 601 dynamic range to map the reference code values to mapped luminance pixel values that fully exploit the Rec. 601 dynamic range supported by the rendering device. In various implementations, the DM metadata can be used by rendering devices that support higher or lower dynamic ranges than those of Rec. 601 and Rec. 709 to map reference code values in the high dynamic range to mapped luminance pixel values that fully exploit the higher or lower dynamic ranges supported by these rendering devices. Additionally and/or optionally, the DM metadata can be used by rendering devices that support color gamuts wider or narrower than, or the same as, those of Rec. 601 and Rec. 709 to map reference code values to mapped chroma or color channel pixel values that fully exploit the wider, narrower or same color gamuts supported by these rendering devices. Additionally and/or optionally, the DM metadata can be used by rendering devices that support spatial resolutions higher or lower than, or the same as, those of Rec. 601 and Rec. 709 to convert the spatial resolution as represented by reference code values to an optimal device-specific spatial resolution that fully exploits the higher, lower or same spatial resolutions supported by these rendering devices.

In some embodiments, DM metadata depends on, and is covariant with, corresponding reference code values on which display management operations based on the DM metadata are to be performed. For example, first DM metadata for a first image or a first scene may be different from second DM metadata for a second and different image or a second or different scene. In some embodiments, DM metadata and its corresponding reference code values representing an image or a scene are delivered in the same video frames (e.g., a subsequence of time-ordered video frames in a sequence of time-ordered video frames, etc.). In some embodiments, the DM metadata and its corresponding reference code values representing an image or a scene are delivered in neighboring video frames within a strict time window (e.g., within one of one video frame, two video frames, . . . , less than N video frames where N is a preconfigured small integer, etc.). For example, the DM metadata can be delivered in a video frame of a time (T−1), whereas the corresponding reference code values can be delivered in another video frame of a time T. In various embodiments, other variations of time-synchronous transmissions of DM metadata and its corresponding reference code values can also be used.

In some embodiments, DM metadata and reference code values can be multiplexed into pixels in video frames which are designated by video link standards, video transmission standards, etc., to carry pixel values for rendering, etc. In an example embodiment, the DM metadata is carried in a plurality of bit fields in pixels of the video frames, which plurality of bit fields are specifically designated by video link standards for carriage of the least-significant bit values of chroma or color channel pixel values. As human vision is not as sensitive to chroma information as to luma information, relatively few visual defects and degradations may be caused by using these bit fields to carry DM metadata.

Since video frames constitute a basic part of video data transmitted through a video link, delivering DM metadata and reference code values in video frames allows the DM metadata to reach recipient devices relatively reliably in a time-synchronous manner, even when the video link is any of a wide variety of different types.

Techniques as described herein can be implemented with any type of video link, including but not limited to HDMI, etc., so long as a video link (or a video data pipeline) is capable of delivering video frames. In some embodiments, a particular video link type (e.g., HDMI, etc.) can support numerous (e.g., billions of, etc.) sink systems ranging from mobile devices of limited display capabilities to high-end professional display systems of superb display capabilities. Under techniques as described herein, source content comprising reference code values and DM metadata can be delivered in a unified pipeline to all these sink systems. The sink systems can then use the DM metadata in the pipeline to adapt the reference code values in the same pipeline to device-specific, manufacturer-specific, or standard-specific pixel values for rendering on target displays in a manner that maximizes respective display capabilities of the target displays.

Techniques as described herein can be used to carry up to a very large amount of DM metadata if necessary in video frames, since a video frame is capable of carrying a large number of pixels (e.g., a 1 k pixel per scan-line, etc.) from which certain bit fields are selected to carry DM metadata transmission packets. In various embodiments, a set number or a variable number of scan-lines (e.g., starting scan-lines, bottom scan-lines, intermediate scan-lines, interleaved scan-lines, contiguous scan-lines, non-contiguous scan-lines, etc.), pixels in a regular pattern, irregular pattern, raster-ordered, etc., in a video frame may be used to carry DM metadata. Different video frames may carry different amounts of DM metadata. In some embodiments, some video frames may not carry DM metadata but rather may use DM metadata transmitted with other video frames to map reference code values in the former video frames. In some embodiments, DM metadata also may be transmitted in a redundant manner so that if there is corruption at certain bit fields, scan-lines, image blocks, video frames, etc., other copies of DM metadata in the transmission pipeline of a video link can be used instead. In some embodiments, cyclic redundancy values to aid error detection and recovery may also be computed for DM metadata transmission packets and transmitted with the DM metadata in the DM metadata transmission packets.

In some embodiments, standard-based metadata delivery mechanisms (e.g., standard-based metadata information frames, etc.) may be used in conjunction with techniques as described herein. However, the techniques as described herein do not depend on the availability, and therefore can operate independently if necessary, of these standard-based metadata delivery mechanisms.

In some embodiments, source and sink systems as described herein can exchange capability information in initial hot plug signals, when selecting a mutually supported video frame and/or video timing, etc. For example, two communicating source and sink systems can negotiate and determine whether techniques as described are mutually supported by both devices and/or by display applications currently running on the sink system. If so, subsequent video frames can be encoded by techniques as described herein to carry both reference code values and DM metadata. On the other hand, if the sink system does not implement techniques as described herein or if the sink system is running display applications that do not implement techniques as described herein, subsequent video frames can be assembled with decompressed video data absent of DM metadata as described herein.

In some embodiments, reference code values (e.g., representing source content of a high dynamic range, a wide color gamut, high resolution, etc.) and DM metadata (e.g., including mapping functions for the reference code values, etc.) can be encoded by a source system into and decoded by a sink system from a video signal in a first video signal format. The video signal in the first video signal format may be transported between the source system and the sink system using a video signal communication path that supports transmission of video signals in the first video signal format. A video signal communication path refers to a video link in a specific playback environment.

Additionally, alternatively, or optionally, in some embodiments, the video signal in the first video signal format may be transported between the source system and the sink system using a video signal communication path that does not support transmission of video signals in the first video signal format. In various embodiments, there may exist one or more constraints relating to one or both of the source system and the sink system, to a video playback environment in which the source system and sink system are deployed, etc., such that a different video signal format other than the first video signal format is supported by the video signal communication path.

Techniques as described herein can be used to transport the reference code values and DM metadata encoded in the first video signal format over a video signal communication path, which does not support the first video signal format but rather supports transmission of video signals in one or more second video signal formats that are different from the first video signal format.

In some embodiments, a communication path between a source system and a sink system, as described herein, may be relayed via one or more third devices such as an audio video receiver (AVR), etc.

In some embodiments, the AVR that relays communication between the source system and the sink system supports a (e.g., standard-based, proprietary, etc.) metadata delivery mechanism (e.g., standard-based metadata information frames, proprietary metadata information frames, etc.) between the source system and sink system. The source and sink systems can exchange capability information in initial hot plug signals (e.g., with a standard-based handshake, via vendor-specific-data-blocks, over vender-specific information frame, etc.), select a mutually supported video frame and/or video timing, etc., over the metadata delivery mechanism, etc.

In some embodiments, metadata delivery mechanisms that can be used to exchange capability information in initial hot plug signals, select a mutually supported video frame and/or video timing, etc., may not be available in specific video playback environments in which source systems and sink systems, as described herein, operate. For example, an AVR (e.g., a legacy device, etc.) that relays communication between a source system and a sink system may not support metadata delivery mechanisms that allow the source system and the sink system to exchange capability information in initial hot plug signals, select a mutually supported video frame and/or video timing, etc.

Techniques as described herein can be used to enable a sink system as described herein to perform specific display management operations based on reference code values and DM data as received from a source system as described herein, even if a metadata delivery mechanism that allows the source system and the sink system to exchange capability information in initial hot plug signals, select a mutually supported video frame and/or video timing, etc., may or may not be available in a specific video playback environment in which the source system and the sink system operate. Furthermore, these techniques may include techniques to enable a source system as described herein to detect whether a sink system is capable of performing display operations based on reference code values and DM data as received from the source system as described herein.

In some embodiments, mechanisms as described herein form a part of a media processing system, including but not limited to: a handheld device, game machine, television, home theater system, set-top box, tablet, mobile device, laptop computer, netbook computer, cellular radiotelephone, electronic book reader, point of sale terminal, desktop computer, computer workstation, computer kiosk, various other kinds of terminals and media processing units, etc.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Reference Code Values and Mapped Pixel Values

Reference code values in a source video signal as described herein can be used to support a wide dynamic range (e.g., high dynamic range, a visual dynamic range, wider than that of Rec. 709, etc.). In some embodiments, a reference code value does not comprise a numeric value of luminance value or a numeric value of luminance value as adjusted by a power function with a gamma value. Rather, the reference code value represents (e.g., as an index value of) a particular quantized level among a plurality of quantized levels of luminance values spanning a supported dynamic range. In some embodiments, reference code values can be mapped to numeric values in a large luminance range (or dynamic range) by one or more mapping functions with mapping function parameters in display management metadata. For example, gray level or luminance values mapped from reference code values as described herein can range from 0 or approximately 0 (e.g., $10^{-7}$ cd/m$^2$, $10^{-5}$ cd/m$^2$, $10^{-4}$ cd/m$^2$, etc.) to a large luminance value (e.g., 12,000 cd/m$^2$, 5000 cd/m$^2$, 600 cd/m$^2$, etc.). Reference coded values may also be used to support a wide range of viewing and/or displaying scenarios with different ambient light levels, and a wide range of display devices with different dark black levels (e.g., in theaters, indoor, outdoor, etc.). Additionally or optionally, reference code values can be mapped by one or more mapping functions with mapping function parameters to numeric color values (e.g., chroma values, RGB values, etc.) in a large portion of a color space (or color gamut). Reference code values in an individual video frame as described herein may represent a subset of quantized levels in the plurality of quantized levels and may be compressed into available code values (e.g., 256 available code values, 1024 available code values, 4096 available code values, etc.) in a code space of a certain bit depth (e.g., 8 bits, 10 bits, 12 bits, etc.).

In some embodiments, reference code values as described herein can, but are not only limited to, be perceptual quantization (PQ) encoded. For example, in some embodiments, a reference code value represents (e.g., as an index value to, etc.) a particular perceptually quantized level among a plurality of perceptually quantized levels of luminance values. The luminance difference between two neighboring perceptually quantized levels of luminance values may be a just noticeable difference or JND, a fraction of JND, a JND as multiplied by a constant multiplicative factor, etc. The plurality of perceptually quantized levels may cover the entirety of a wide dynamic range which a source video signal as described herein is configured to support.

DM metadata as described herein refers to metadata that is to be used by a media sink system to perform display management operations as a part of video image rendering operations. Examples of DM metadata include but are not limited to: mapping function parameters for luminance mapping functions, mapping function parameters for chrominance mapping functions, global image or frame properties, aspect ratios of source video frames, signal transform matrix coefficients, gamma values, bit depths, color spaces, sampling formats, black levels, luminance value ranges, chroma value ranges, a source display's (e.g., minimum, maximum, average, etc.) luminance values, other global characteristics, etc., a scene or individual image's (e.g., minimum, maximum, average, etc.) luminance values, other global characteristics, etc., a diagonal size of a source display (e.g., a reference display, etc.), etc. In some embodiments, at least some of the operational parameters included in the DM metadata (e.g., the mapping function parameters for mapping functions, etc.) are image-dependent. In some embodiments, at least some of the mapping functions with their mapping function parameters in the DM metadata may be applied by the media sink system to map reference code values to mapped pixel values. The mapping parameters in the DM metadata may represent lookup tables, mapping curves, mapping functions comprising piecewise line segments, pivot points for line or curve segments, etc.

In some embodiments, DM metadata is not encoding information (e.g., at 4×4, 8×8, etc., image block level) that accompanies decoded pixel information to facilitate re-encoding the decoded pixel information or reconstructing an image. Rather, the DM metadata is metadata to map corresponding reference code values to mapped pixel values for rendering the video image on a target display so that the display capability of the target display is maximized, that the number of pixels with clipped luminance values and/or clipped chrominance values is minimized, etc., when the video image is rendered on the target display. Some or all of the DM metadata may be repeated in carrying video frames for error protection and recovery. In some embodiments, DM metadata may be derived with color management applications or some other applications.

In an example, when a video image derived from a source image (e.g., a scene-referred image, etc.) shows one or more salient objects in a dark luminance level distribution, relatively numerous reference code values that can be mapped to dark luminance levels may be used to code the video image into a source video signal as described herein. The mapped dark luminance levels can be rendered by a media sink system to produce the same or substantially (e.g., within 5%, 10%, 20%, etc., of a JND) the same luminance levels for the dark salient objects in the rendered image that closely approximates the scene-referred image.

In another example, when a video image derived from a source image (e.g., a scene-referred image, etc.) shows one or more salient objects in a bright luminance level distribution, relatively numerous reference code values that can be mapped to bright luminance levels may be used to code the video image into a source video signal as described herein. The mapped bright luminance levels can be rendered by a media sink system to produce the same or substantially (e.g., within 5%, 10%, 20%, etc., of a JND) the same luminance levels for the bright salient objects in the rendered image that closely approximates the scene-referred image.

Techniques as described herein can be used to map a large number of pixels that capture salient content of a source image of a wide dynamic range to the same or substantially the same luminance levels in a corresponding rendered image on a media sink system. As compared with other approaches, the approach under techniques as described herein maintains perceptual qualities of source images in rendered images to a relatively great extent.

Techniques as described herein can also be used to individually globally modulate one or more primary channels (e.g., chroma channels, red, green, blue, or other) of an adopted color space. The individual modulations of the primary channels reshape the color balance in color gamut, and are beneficial if certain colors (hue and saturation areas in images) are more dominant than others. For example, in a scene with dominant reds and only a few muted blues, relatively numerous red reference code values and a relatively few blue reference code values can be allocated.

In some embodiments, a video image as represented by reference code values of a video frame may comprise many highlights in relation to other video images; mapping function parameters for a luminance mapping function to be used to map luminance levels in the reference code values to mapped luminance levels of a video rendering device enable a media sink system (e.g., a video rendering device, etc.) to allocate more bright luminance levels than otherwise. Similarly, a video image as represented by reference code values of a video frame may comprise many dark regions in relation to other video images; mapping function parameters for a luminance mapping function to be used to map luminance levels in the reference code values to mapped luminance levels of a video rendering device enable the video rendering device to allocate more low luminance levels than otherwise. Additionally and/or optionally, DM metadata can also be used to allocate more differentiating color levels or values to more dominant colors in a video image. Additionally and/or optionally, DM metadata can also be used to convey other DM operational parameters (e.g., aspect ratios of video frames, etc.) to a media sink system. As a result, a video rendering device that makes use of the DM metadata as described herein can produce video images with a higher dynamic range and a wider color gamut than otherwise.

In some embodiments, "mapped pixel values, luminance values, and chroma values" as used herein may refer to device-specific pixel values, luminance values, and chroma values (e.g., representing a proprietary dynamic range or color gamut, etc.). In some embodiments, "mapped pixel values, luminance values, and chroma values" as used herein may refer to standard-based pixel values, luminance values, and chroma values pursuant to a standard (e.g., Rec. 709, standard dynamic range or SDR, video standards governing mobile devices, video standards governing tablet computers, etc.).

A video link as used herein refers to a pipeline (e.g., as a video signal, video bitstream, etc.) for delivering video and related data from a source system to a sink system. In some embodiments, reference code values are delivered with DM metadata over the video link from the source system to the sink system in compliance with one or more video link standards governing the video link.

3. Media Source System

FIG. 1 shows a media source system (100) in accordance with one or more embodiments. As shown in FIG. 1, the system (100) includes a Source Video Receiver (104), a Video Frame Generator (106), a Video Encoder (110), and a Video Memory (108), which comprises a frame buffer, a display management (DM) metadata buffer, etc.

Each of these components is described below and may be located on the same device (e.g., a set-top box, a computer, a server system, a client system, etc.) or may be located on separate devices coupled by a network (e.g., Internet, Intranet, Extranet, Local Area Network (LAN), Wide Area Network (WAN), etc.), with wired and/or wireless segments. In one or more embodiments, the system 100 is implemented using a client-server topology. The system (100) itself may be an application running on one or more computers, and in some embodiments could be a peer-to-peer system, or resident upon a single computing system. In addition, the system (100) is accessible from other machines using one or more interfaces or any other tool to access the system 100. In one or more embodiments, the system (100) is accessible over a network connection, such as the Internet. Information and/or services provided by the system (100) may also be stored and accessed over the network connection.

In an embodiment, the Source Video Receiver 104 corresponds to software and/or hardware configured to receive a source video signal 102 and derive (e.g., extract, decode, generate, determine, compute, etc.), from the source video signal (102), reference code values in one or more video frames and DM metadata specifically corresponding to the reference code values. The one or more video frames may be a part of a time sequence of video frames decoded by the Source Video Receiver 104 from the source video signal (102).

The Source Video Receiver 104 may be configured to derive and separate different data components carried in the source video signal (102). For example, audio/video data and DM metadata in the source video signal may be separated into separate components (e.g., audio components, video components, metadata components, etc.) using a demultiplexer. In some embodiments, DM metadata may be embedded within, and extracted from, the video components. In some embodiments, DM metadata may be carried in, and decoded from, separate metadata components of the source video signal.

In an embodiment, the Video Frame Generator (106) corresponds to software and/or hardware configured to receive reference code values and DM metadata derived from a source video signal (102), generate DM metadata transmission packets to store DM metadata, and store/set both the reference code values and the DM metadata transmission packets containing DM metadata in bit fields of one or more video frames in the Video Memory (108). In an example, the Video Frame Generator (106) can receive DM metadata derived from source video signal (102) from the Source Video Receiver (104). In another example, the Video Frame Generator (106) can receive DM metadata from a module other than the Source Video Receiver (104). In some embodiments, the Video Frame Generator (106) is configured to select specific bit fields of the one or more video frames to store the DM metadata transmission packets containing the DM metadata. In some embodiments, the specific bit fields selected to carry the DM metadata are originally designated, by one or more video signal standards governing a video link from the media source system to a downstream media sink system, to carry the least-significant bits of component pixel values in one or more channels (e.g., chroma channels, luminance channels, red, green and/or blue channels, etc.) of an adopted color space (e.g., YCbCr, RGB, etc.). In a non-limiting example embodiment, the specific bit fields are only selected from bit fields originally designated to store chroma pixel values. In some embodiments, bit fields that are selected to store DM metadata are from a plurality of contiguous pixels in a video frame. In some embodiments, bit fields that are selected to store DM metadata are from a plurality of non-contiguous pixels in a video frame. In some embodiments, bit fields that are selected to store DM metadata are from a plurality of pixels in one or more scan-lines (e.g., one or more beginning scan-lines, one or more ending scan-lines, one or more intermediate scan-lines, etc.) of a video frame. In some embodiments, a single copy of a DM metadata transmission packet containing at least a portion of DM metadata is stored in bit fields of, or embedded in, video frames. In some embodiments, multiple copies of a DM metadata transmission packet containing at least a portion of DM metadata are stored in bit fields of, or embedded in, video frames, in order to provide redundancy and increase transmission reliability for the DM metadata. In some embodiments, a video frame may comprise an indication that the video frame does not contain the DM metadata that should be used to perform display management operations on the pixel values of the video frame and that the DM metadata that was received or will be received in another DM metadata transmission packet should be used in performing such operations.

A DM metadata transmission packet as described herein may refer to any data container that comprises a payload section and one or more other sections to store at least one cyclic redundancy value and possibly other control or signal information. In an example implementation, a cyclic redundancy value can be computed from byte or word values stored in the payload section and placed at trailing bytes (e.g., in a section separate from the payload section, etc.) of the DM metadata transmission packet. In another example implementation, a cyclic redundancy value may be computed at least in part with byte or word values in a header section of the DM metadata transmission packet. One or more of other error protection and correction mechanisms other than packet redundancy and CRC values (e.g., computed with a generator polynomial, etc.) may be used to protect and recover from errors (e.g., bit errors, jitters, cross talks, etc.) that may occur in the transmission of DM metadata transmission packets as described herein from an upstream device (e.g., a media source system, etc.) to a downstream device (e.g., a media sink system, etc.).

In one or more embodiments of the invention, the Video Memory (108) corresponds to a memory space configured to handle relatively fast video processing operations including but not limited to, bulk memory copying operations, bulk memory moving operations, fast memory filling operations, etc. The Video Memory (108) can be configured to support static and/or dynamic memory allocation. The Video Memory (108) may comprise a video frame buffer to hold all bit fields of one or more video frames and a DM metadata buffer to hold DM metadata that are associated with reference code values filled in the one or more video frames in the video frame buffer. A video frame stored in the Video Memory (108) may be associated with one of a variety of color spaces including but not limited to: YCbCr color spaces, RGB color spaces, etc. A video frame stored in the Video Memory (108) may be associated with one of a variety of sampling formats (e.g., chroma sampling formats, etc.) including but not limited to: 4:4:4 sampling formats, 4:2:2 sampling formats, 4:2:0 sampling formats, etc. A multitude of implementations (e.g., arrays, sequences, data structures, linked lists, cyclic buffers, hash tables, etc.) may be used for organizing the memory space and storing video data in the Video Memory (108).

In an embodiment, the Video Encoder (110) corresponds to software and/or hardware configured to retrieve one or more video frames in the Video Memory (108) with reference code values, combine DM metadata into the video frames (e.g., packetizing, embedded in LSB of chroma channel, etc.) with the reference code values, and generate/encode an encoded video signal (112) to be transmitted to a media sink system based at least in part on the retrieved video frames in the Video Memory (108). As used herein, an encoded video signal refers to a video signal (e.g., the encoded video signal 112 with metadata embedded in LSB of chroma channels, etc.) in which DM metadata has been embedded within pixels of some or all video frames in the video signal; generating or encoding an encoded video signal refers to generating or encoding a video signal in which the DM metadata is embedded within the pixels of the video frames. The retrieved video frames, or bit fields therein, contain both reference code values (which comprise component pixel values with some of the least-significant bits replaced with bit values of the DM metadata transmission packets containing the DM metadata, etc.) and DM metadata to be used by a downstream media sink system to perform display management operations on the reference code values as a part of video rendering operations. The encoded video signal (112) as generated/encoded by the Video Encoder complies with the video link standards governing the video link with downstream media sink systems in terms of video formats and transmission protocols; however, the video frames carried in the encoded video signal (112) carry both the reference code values and DM metadata. In embodiments in which only the least-significant bits of chroma pixel values are selected to store the DM metadata, a media sink system that does not implement techniques as described herein can render near-original-quality video images since the loss of the least-significant bits in chroma pixel values introduce little perceptible artifacts. Furthermore, a media sink system that does implement techniques as described herein can use DM metadata to render high-quality video images with a high dynamic range, a wide color gamut, fine perceptible image details, etc., that closely approximate what had been captured in the original scene-referred images.

4. Media Sink System

Figure 2:
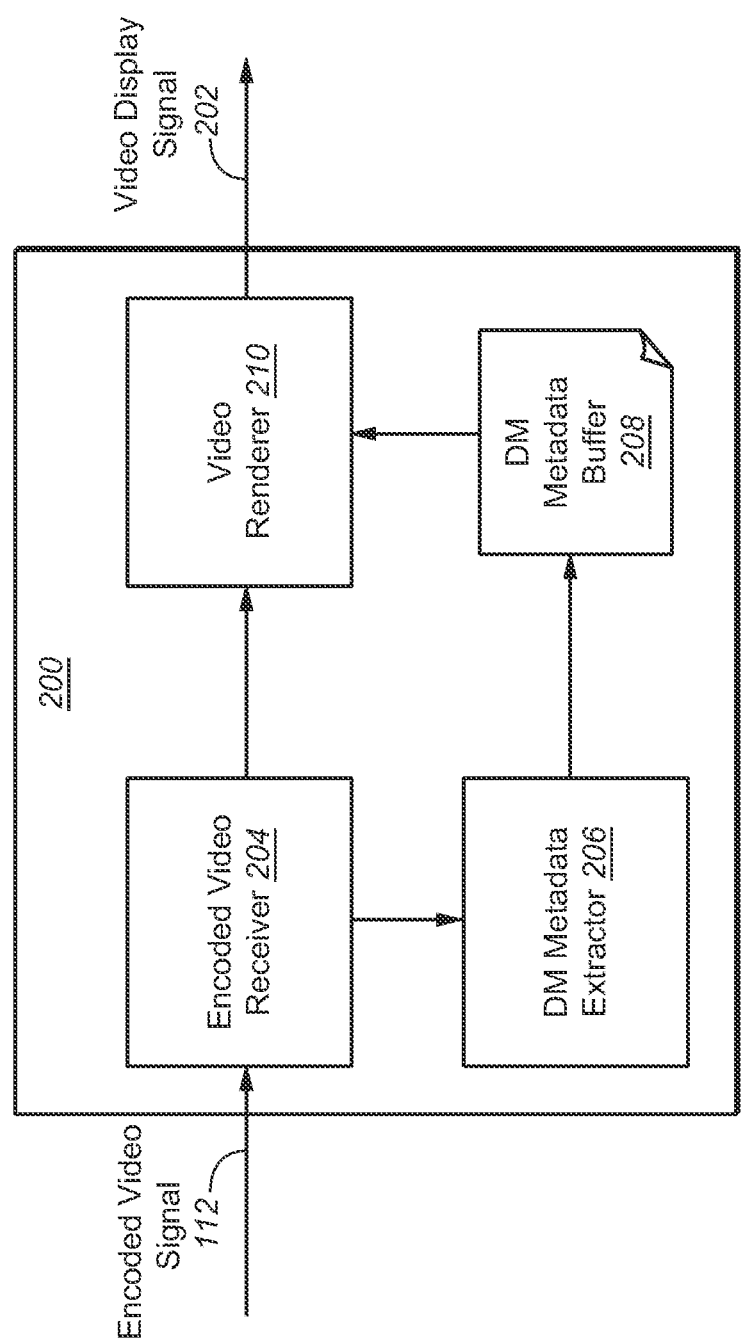
FIG. 2 shows a media sink system.

FIG. 2 shows a media sink system (200) in accordance with one or more embodiments. As shown in FIG. 2, the system (200) includes an Encoded Video Receiver (204), a DM metadata extractor (206), a Video Renderer (210), and a Video Memory (not shown) comprising a DM Metadata Buffer (208) to store DM metadata derived from an encoded video signal (112).

Each of these components is described below and may be located on the same device (e.g., a television, a set-top box, a tablet, a mobile device, a computer, a server system, a client system, etc.) or may be located on separate devices coupled by a network (e.g., Internet, Intranet, Extranet, Local Area Network (LAN), Wide Area Network (WAN), etc.), with wired and/or wireless segments. In one or more embodiments, the system 200 is implemented using a client-server topology. The system (200) itself may be an application running on one or more computers, and in some embodiments could be a peer-to-peer system, or resident upon a single computing system. In addition, the system (200) is accessible from other machines using one or more interfaces or any other tool to access the system 200. In one or more embodiments, the system (200) is accessible over a network connection, such as the Internet. Information and/or services provided by the system (200) may also be stored and accessed over the network connection.

In an embodiment, the Encoded Video Receiver 204 corresponds to software and/or hardware configured to receive encoded video signal 112 and derive (e.g., extract, decode, generate, determine, compute, etc.), from the encoded video signal (112), one or more video frames comprising reference code values and DM metadata specifically corresponding to the reference code values. The one or more video frames—comprising the reference code values and the DM metadata—as decoded by the Encoded Video Receiver 204 from the encoded video signal (112) may be a part of a time sequence of video frames.

The Encoded Video Receiver 204 may be configured as a video link receiver conforming to the video link standards governing the video link over which the encoded video signal 112 is received. The Encoded Video Receiver 204 may be further configured to derive and separate different data components carried in the encoded video signal (112). For example, audio/video data in encoded video signal (112) may be separated into separate components (e.g., audio components, video components, etc.) using a demultiplexer.

In an embodiment, the DM Metadata Extractor (206) corresponds to software and/or hardware configured to receive one or more video frames comprising reference code values and DM metadata derived from an encoded video signal (112), retrieve DM metadata transmission packets that store DM metadata from a plurality of bit fields in the video frames, and extracts/derives the DM metadata from the DM metadata transmission packets, and stores/caches the DM data in the DM Metadata Buffer (208). For example, the DM Metadata Extractor (206) can be configured to select specific bit fields (e.g., the least-significant bits of a specific channel, bit fields on one or more specific scan-lines, bit fields of in a pattern of a video frame, etc.) of the one or more video frames, extract bit values from these specific bit fields, assemble the extracted bit values into the DM metadata transmission packets, and extract the DM metadata from the payloads of the DM metadata transmission packets into the DM Metadata Buffer (208).

The DM Metadata Extractor (206) can be configured to retrieve a single copy of a DM metadata transmission packet or one of multiple copied of the same DM metadata transmission packets from the video frames. In some embodiments, the DM Metadata Extractor (206) is configured to verify if a DM metadata transmission packet is corrupted. For example, the DM Metadata Extractor (206) can compute a CRC value from a DM metadata transmission packet (e.g., the first 992 bits of the packet, etc.) and determine if the computed CRC value matches a communicated CRC value (e.g., in the trailing bytes of the DM metadata transmission packet, etc.). If the CRC values do not match, then the DM Metadata Extractor (206) may be configured to discard the DM metadata transmission packet as being corrupted and try to retrieve another copy of the same DM metadata transmission packet carried in the same video frame (e.g., a different portion or a different subset of bit fields in the video frame, etc.) or in a different video frame (e.g., a video frame before or after the video frame containing the corrupted copy, etc.).

In one or more embodiments of the invention, the DM Metadata Buffer (208) corresponds to a memory space configured to handle relatively fast video processing operations including but not limited to, bulk memory copying operations, bulk memory moving operations, fast memory filling operations, etc. The DM Metadata Buffer (208) can be configured to support static and/or dynamic memory allocation. The DM Metadata Buffer (208) may be a part of video memory that additionally comprises a video frame buffer to hold all bit fields of one or more video frames initially decoded from the encoded video signal (112). A video frame decoded from the encoded video signal (112) may be associated with one of a variety of color spaces including but not limited to: YCbCr color spaces, RGB color spaces, etc. A video frame decoded from the encoded video signal (112) may be associated with one of a variety of sampling formats (e.g., chroma sampling formats, etc.) including but not limited to: 4:4:4 sampling formats, 4:2:2 sampling formats, 4:2:0 sampling formats, etc.

In an embodiment, the Video Renderer (210) corresponds to software and/or hardware configured to retrieve reference code values (e.g., without certain bit values in some pixels of a video frame, without the least-significant bit values in pixels of one or more scan-lines, etc.) from one or more video frames decoded from the encoded video signal (112), apply display management operations on the reference code values including mapping component pixel values in the reference code values to mapped component pixel values, and generate, based on the mapped component pixel values, a video display signal (202), which can be used to drive video rendering operations and render images represented by the reference code values in the video frames. A media sink system as described herein can use DM metadata to render high-quality video images with a higher dynamic range, a wider color gamut, finer perceptible image details, etc., than other approaches that do not implement the techniques as described herein.

5. Algorithms to Transmit and Receive Dm Metadata

Techniques for performing display management operations may be implemented on a target display through a media sink system (e.g., 200 of FIG. 2, etc.). The encoded video signal (e.g., 112 of FIG. 1 and FIG. 2, etc.) can be generated outside the target display, which may be operate in conjunction with or may be a part of the Media Sink System (200). The encoded video signal (112) with DM metadata needed for display management operations may be transmitted to the Media Sink System (200) over a video link (e.g., a HDMI link, etc.).

Figure 3:
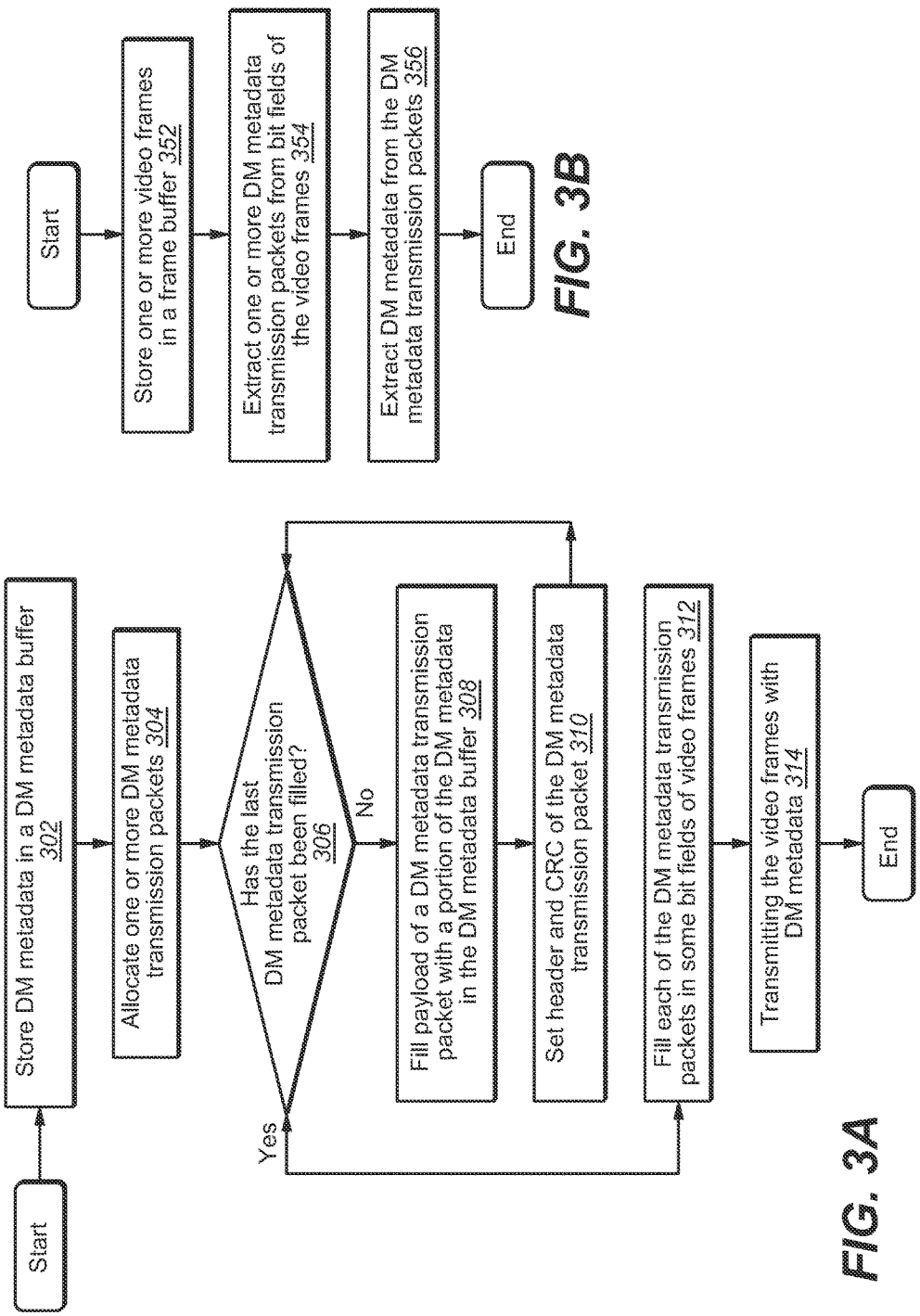
FIG. 3A and FIG. 3B illustrate example algorithms or process flows for conveying display management metadata between a media source system and a media sink system.

FIG. 3A illustrates an example algorithm or process flow to transmit DM metadata from a media source system (e.g., 100 of FIG. 1, etc.) to a media sink system (e.g., 200 of FIG. 2, etc.). In some example embodiments, one or more computing devices or components (e.g., a Media Source System 100, a Source Video Receiver 104, a Video Frame Generator 106, a Video Encoder 110, etc.) may perform this process flow.

For the purpose of illustration only, a Video Frame Generator (106) receives reference code values of one or more video frames and DM metadata to be used to perform display management operations on the reference code values. The reference code values and the DM metadata may be decoded by a Source Video Receiver (e.g., 104 of FIG. 1, etc.) from a source video signal (102).

In block 302, the Video Frame Generator (106) stores the one or more video frames with the reference code values in a frame buffer (e.g., YCbCr 4:2:2 frame buffer, etc.), and stores the DM metadata in a DM metadata buffer (e.g., in Video Memory 108 of FIG. 1, etc.). The DM metadata may occupy N bytes. In an example implementation, one or more (e.g., unfilled, etc.) portions of the DM metadata in the DM metadata buffer can be sequentially ordered and then filled into payloads of the one or more (e.g., unfilled, etc.) DM metadata transmission packets, for example, along a byte boundary, a word boundary, etc.

In block 304, the Video Frame Generator (106) allocates memory (e.g., in Video Memory 108 of FIG. 1, etc.) for one or more DM metadata transmission packets to hold the N bytes of the DM metadata. In some embodiments, a DM metadata packet may contain a payload that can hold a maximum of M bytes.

In block 306, the Video Frame Generator (106) determines whether the last DM metadata transmission packet among the allocated DM metadata transmission packets has been filled. In response to determining that the last DM metadata transmission packet has not been filled (as indicated by the "no" path in FIG. 3A), the process flow goes to block 308.

In block 308, the Video Frame Generator (106) fills the payload of the first of one or more remaining unfilled DM metadata transmission packets with the first of one or more remaining unfilled portions of the DM metadata in the DM metadata buffer.

In block 310, the Video Frame Generator (106) sets/populates the header of the currently processed packet (the DM metadata transmission packet whose payload is filled in block 308), computes a CRC value (e.g., a CRC-32 value, etc.) from the currently processed packet (e.g., the first 992 bits of the packet, etc.), and stores the CRC value in the tail (e.g., the last four trailing bytes, etc.) of the currently processed packet. The process flow then goes to block 306.

In response to determining that the last DM metadata transmission packet has been filled (as indicated by the "yes" path in FIG. 3A), the process flow goes to block 312, in which the Video Frame Generator (106) fills each of the DM metadata transmission packets in a plurality of bit fields of the one or more video frames stored in the frame buffer. Specific bit fields (e.g., the least-significant bits of chroma pixel values, etc.) may be selected for filling the DM metadata transmission packets.

In block 314, the Media Source System (100) transmits the video frames in the frame buffer to a downstream device (e.g., a Media Sink System 200 of FIG. 2, etc.), for example, in an encoded video signal (112) through a video link (e.g., HDMI, LVDS, V×1, HD-SDI, etc.).

FIG. 3B illustrates an example algorithm or process flow to receive DM metadata from a media source system (e.g., 100 of FIG. 1, etc.) by a media sink system (e.g., 200 of FIG. 2, etc.). In some example embodiments, one or more computing devices or components (e.g., a Media Sink System 200, an Encoded Video Receiver 204, a DM Metadata Extractor 206, a Video Renderer, etc.) may perform this process flow.

In block 352, the Media Sink System (200) stores one or more video frames (e.g., YCbCr 4:2:2 frames, etc.) in a frame buffer (e.g., in video memory of the Media Sink System 200, etc.). The video frames may be decoded by the Media Sink System (200) from an encoded video signal (112) received through a video link (e.g., HDMI, LVDS, V×1, HD-SDI, etc.).

In block 354, the Media Sink System (200) extracts one or more DM metadata transmission packets from a plurality of pixels in the video frames in the frame buffer. In some embodiments, a DM metadata packet may contain a payload that can hold a maximum of M bytes. Each of the one or more DM metadata transmission packets may be in a respective group of selected pixels (e.g., 1024 pixels, etc.) in the plurality of pixels. Selected bit fields (e.g., the least-significant bits for chroma channels, etc.) in the plurality of pixels may be used to carry the one or more DM metadata transmission packets in the video frames.

In block 356, the Media Sink System (200) extracts DM metadata from the payloads of the DM metadata transmission packets.

In some embodiments, the Media Sink System (200) runs a CRC test on an extracted DM metadata transmission packet to detect if there is an error with the extracted DM metadata transmission packet. If there is an error detected in the CRC test, the Media Sink System (200) is configured to extract a replicate/redundant copy of the DM metadata transmission packet from the video frames. If there is no error detected in the CRC test, the Media Sink System (200) is configured to skip any replicated/redundant copies of the DM metadata transmission packet in the video frames.

In some embodiments, the DM metadata is precisely synchronized to a corresponding video frame on which display management operations based at least in part on the DM metadata are to be performed in video rendering operations. In some embodiments, this synchronous transmission of the DM metadata with reference code values of the corresponding video frame to a recipient device is achieved by embedding the DM metadata with the reference code values in the same video frame or video frames adjacent to one another in an encoded video signal before transmitting the encoded video signal over the video link. In this way, the DM metadata reaches a display management module of the recipient device at the same time (e.g., in the same video frame, in a video frame preceding the corresponding video frame, etc.) or at the substantially same time (e.g., in a video frame within a fixed time window from the corresponding video frame, etc.) as its corresponding reference code values.

In some embodiments, DM metadata with a time stamp T is transmitted in an encoded video signal with reference code values of a video frame buffer with a time stamp T−1, T−2, etc., so that the display management module may have enough time to process the DM metadata (including but not limited to any initialization operations, etc.).

6. HDMI Video Links

Techniques as described herein can be further illustrated with an example implementation for supporting display management metadata transmission over a HDMI video link (e.g., an HDMI 1.4 video link, an HDMI 2.0 video link, etc.). General information relating to video link standards can be found in a variety of references including but not limited to: CEA-861-F, A DTV Profile for Uncompressed High Speed Digital Interfaces, Draft V15, Jul. 31, 2012; High-Definition Multimedia Interface Specification Version 1.4a; High-Definition Multimedia Interface Specification Version 2.0 R10; For Television—Transporting MPEG-2 Recoding Information through 4:2:2 Component Digital Interfaces, SMPTE 319M-2000, etc., which are incorporated by reference as if originally set forth in their entirety herein.

In some embodiments, HDMI standards can be extended with techniques as described herein to send an encoded video signal from a media source system (e.g., a set-top box, a Media Source System 100 of FIG. 1, etc.) to a media sink system (e.g., a TV with an HDMI interface, a Media Sink System 200 of FIG. 2, etc.). Techniques as described herein can make use of video frame formats and transmission protocols as specified in the HDMI standards for a HDMI video link to transmit DM metadata with reference code values in pixels of video frames in compliance with these video frame formats and transmission protocols.

In some embodiments, a media processing device as described herein is in compliance with HDMI version 1.4a or higher, and supports HD and UHD resolutions with progressive timing (e.g., HD resolutions with frame rate up to 60 frame per second (fps), 4K×2K resolutions with frame rate up to 30 fps, etc.). In some embodiments, a media processing device as described herein is in compliance with HDMI version 2.0, and supports 4K×2K resolutions with frame rate up to 60 fps. The term "compliance" as used herein means populating, storing, filling, transmitting, receiving, decoding, etc., bit fields of a video frame with reference code values and DM metadata in relation to a video frame that is in compliance with a video format as specified in a video link standard (e.g., HDMI 1.4a, HDMI 2.0, etc.), notwithstanding that the video link standard originally designates only pixel values to be stored in these bit fields of the video frame.

In some embodiments, a media processing device as described herein is configured to use one of a variety of video frame formats (e.g., a YCbCr 4:2:2 video frame, etc.) as specified in the video link standards. A video frame format as described herein may carry a color value of one of a variety of bit depths (e.g., 12+ bits per color, etc.).

In some embodiments, a media processing device as described herein is configured to use signal transmission protocols as specified in the video link standards. In some embodiments, a media source system is configured to read a downstream device's capability information (e.g., in enhanced extended display identification data or E-EDID as received from the downstream device, etc.) and deliver only the audio and video formats supported by the downstream device. In some embodiments, a media sink system as described herein indicates that it is capable of operating with DM metadata delivered with reference code values in pixels of video frames by setting a one-bit flag in a HDMI vendor specific data block of E-EDID.

Conversely, a downstream device that implements techniques as described herein can be configured to read an upstream device's capability information (e.g., in an InfoFrame as received from the upstream device, etc.) and process the received audio and video data appropriately. In some embodiments, a media source system signals transmission of an encoded video signal as described herein by setting a one-bit flag in the HDMI vendor specific InfoFrame.

In some embodiments, the capability information for processing and transmitting DM metadata with reference code values in pixels of video frames is set in one or more reserved bits in an information frame, a data block, etc., as specified by the video link standards.

In some embodiments, before transmitting DM metadata in video frames, a media source system (e.g., 100 of FIG. 1, etc.) reads the capability indication as provided by a media sink system (e.g., 200 of FIG. 2, etc.). If the media sink system does not indicate a capability of supporting DM metadata embedded in video frames, the media source system may be configured not to embed DM metadata in video frame; rather, the media source system may be configured to populate video frames with pixel values that can be decoded and rendered by a downstream device without performing DM operations as described herein. If the media sink system indicates a capability of supporting DM metadata embedded in video frames, the media source system may be further configured to determine whether the media sink system is in display application settings that operate with DM metadata. If the media sink system indicates that its display application settings operate with DM metadata, the media source system may proceed to select a mutually supported video frame format (e.g., YCbCr 4:2:2 frames, etc.) with a mutually supported video timing scheme (e.g., 30 fps, 60 fps, etc.), generate/encode DM metadata in video frames in the supported video frame format, set an indication in the encoded video signal that the video frames with the mutually supported video frame format and the mutually supported video timing scheme are encoded with DM metadata therein, and send the encoded video signal to the media sink system with the indication. The media sink system extracts DM metadata embedded in the video frames, applying DM operations on reference code values extracted from the same video frames and renders video images as represented by the reference code values in the display application settings. In some embodiments, the DM operations include but are not limited to applying mapping functions to reference code values to derive mapped luminance values and chroma values into a relatively high dynamic range and a relatively wide color gamut while preserving perceptual image details in rendered images.

In some embodiments, multiple video frames (e.g., a scene, etc.) share a single set of DM metadata. In some embodiments, each individual video frame of one or more video frames has its own set of DM metadata. The DM metadata is synchronized to its corresponding video frame(s) whose reference code values are to be operated by DM operations based at least in part on the DM metadata.

In some embodiments, each time a new set of DM metadata is to be transmitted to a downstream device for corresponding video frames, a new DM metadata identifier (e.g., a sequentially incremented number, etc.) is used. In some embodiments, DM metadata transmission packets include two fields, a first DM metadata identifier for a first set of DM metadata carried in the DM metadata transmission packets and a second DM metadata identifier for a second set of DM metadata that is to be used by DM operations on video frames carrying the DM metadata transmission packets. Thus, if the first and second DM metadata identifiers are the same, the set of DM metadata is used by the DM operations on the video frames carrying the DM metadata transmission packets. Otherwise, the first set of DM metadata is to be used by DM operations for other video frames (e.g., subsequent video frames, etc.) that are identified by the first DM metadata identifier (which would be a second DM metadata identifier relative to the other video frame).

A DM metadata transmission package may carry a header field used to indicate whether there is DM metadata transmitted in the same video frame that carries the DM metadata packet. Other information, including but not limited to metadata version information, metadata type information, packet type information, etc., may be included as a part of a DM metadata transmission packet, for example, in the header of the packet. In some embodiments, the packet type information can be used to indicate whether this DM metadata transmission packet is a single packet carrying an (entire) set of DM metadata, or whether this packet is the first packet of multiple packets carrying a set of DM metadata, or whether this packet is an intermediate packet of the multiple packets, or whether this packet is the last packet of the multiple packets.

7. Tunneling Reference Code Values and Dm Data

In some embodiments, a source system as described herein is configured to encode reference code values and DM metadata in a video signal corresponding to a video signal format, transmit the video signal in the same video signal format to a recipient sink system, etc.

In some embodiments, a source system as described herein is configured to encode reference code values and DM metadata in a first video signal corresponding to a first video signal format, map color channels (e.g., components of a first color space, etc.) of the first video signal in the first video signal format into a second video signal in a second video signal format, transmit the second video signal in the second video signal format to a recipient sink system, etc.

FIG. 6A illustrates an example system configuration that comprises a source system 602 and a sink system 604 that communicates in a video signal communication path 606 with video signals of the second video signal format that is different from the first video signal format in which reference code values and DM metadata are encoded. In some embodiments, the source system (602) in FIG. 6A and FIG. 6B may be the same as the source system (100) or may implement some or all components in the source system (100) of FIG. 1. In some embodiments, the sink system (604) in FIG. 6A and FIG. 6B may be the same as the sink system (200) or may implement some or all components in the sink system (200) of FIG. 2.

For the purpose of illustration, the first video signal format is a 12-bit YCbCr video signal format; the second video signal format is an 8-bit RGB video signal format; the video signal communication path (606) may be an HDMI link supported by a wide variety of media devices. In some embodiments, the first video signal format is implemented by later generation devices. In some embodiments, the second video signal format is implemented by a wide variety of early (e.g., legacy, etc.) and/or later generation devices.

The source system (602) may be configured to encode reference code values and DM metadata in a video signal in the first video signal format. In an example scenario, the source system (602) was initially released with a combination of software, firmware, hardware, etc., that did not support encoding reference code values and DM metadata in video signals in the first video signal format. For example, the source system (602) might be initially configured to encode pixel values into video signals in the second video signal format (e.g., 8-bit RGB video format, etc.), transmit the video signals in the second video signal format (e.g., over an 8-bit HDMI link, etc.), etc. Subsequently, after receiving and installing software updates, firmware updates, etc., the source system (602) is now capable of processing and encoding reference code values and DM metadata in video signals in the first video signal format.

The sink system (604) may be configured to decode reference code values and DM metadata from video signals in the first video signal format. In an example scenario, the sink system (604) was initially released to a user with a combination of software, firmware, hardware, etc., that did not support decoding reference code values and DM metadata from video signals in the first video signal format. For example, the sink system (604) might be initially configured to receive video signals in the second video signal format (e.g., over an 8-bit HDMI link, etc.), decode pixel values from the video signals in the second video signal format (e.g., 8-bit RGB format, etc.), etc. Subsequently, after receiving and installing software updates, firmware updates, etc., the sink system (604) is now configured to decode reference code values and DM metadata from video signals in the first video signal format.

In some embodiments, a communication path between the source system (602) and the sink system (604) does not support transmission of video signals encoded in the first video signal format. This may be due to one or more constraints in one or more of software, firmware, hardware, etc., that are related to one or more of the source system (602), the sink system (604), the video playback environment, one or more intermediate devices in the communication path between the source system (602) and the sink system (604), etc.

Instead, the communication path between the source system (602) and the sink system (604) may support transmission of video signals in the second video signal format. The second video signal format may be, but is not limited only to: any one of (e.g., commonly, etc.) supported video signal formats by a wide variety of set-top boxes, tablet computers, game consoles, display devices, etc.

Techniques as described herein can be used to provide a method of transmitting video signals comprising reference code values and DM metadata encoded in the first video signal format over a video signal communication path that supports a different video signal format, such as the second video signal format, other than the first video signal. These techniques may be used to support a commonly and/or widely implemented HDMI interfaces, thereby allowing a wide variety of devices such as tablets, gaming consoles, set-top boxes, etc., to perform high quality display operations using reference code values and DM metadata as described herein.

For the purpose of illustration only, the first video signal format may be a 12 bit YCbCr 4:2:2 (video signal) format, whereas the second video signal format may be an 8-bit RGB (video signal) format. The 8-bit RGB format is supported by the video signal communication path (606) established through an 8-bit HDMI (e.g., transmitter, etc.) interface in the source system (602), an 8-bit HDMI (e.g., receiver, etc.) interface in the sink system (604), one or more intermediate devices such as an AVR, etc., relaying communication in the video signal communication path (606) between the source system (602) and the sink system (604).

Figure 7:
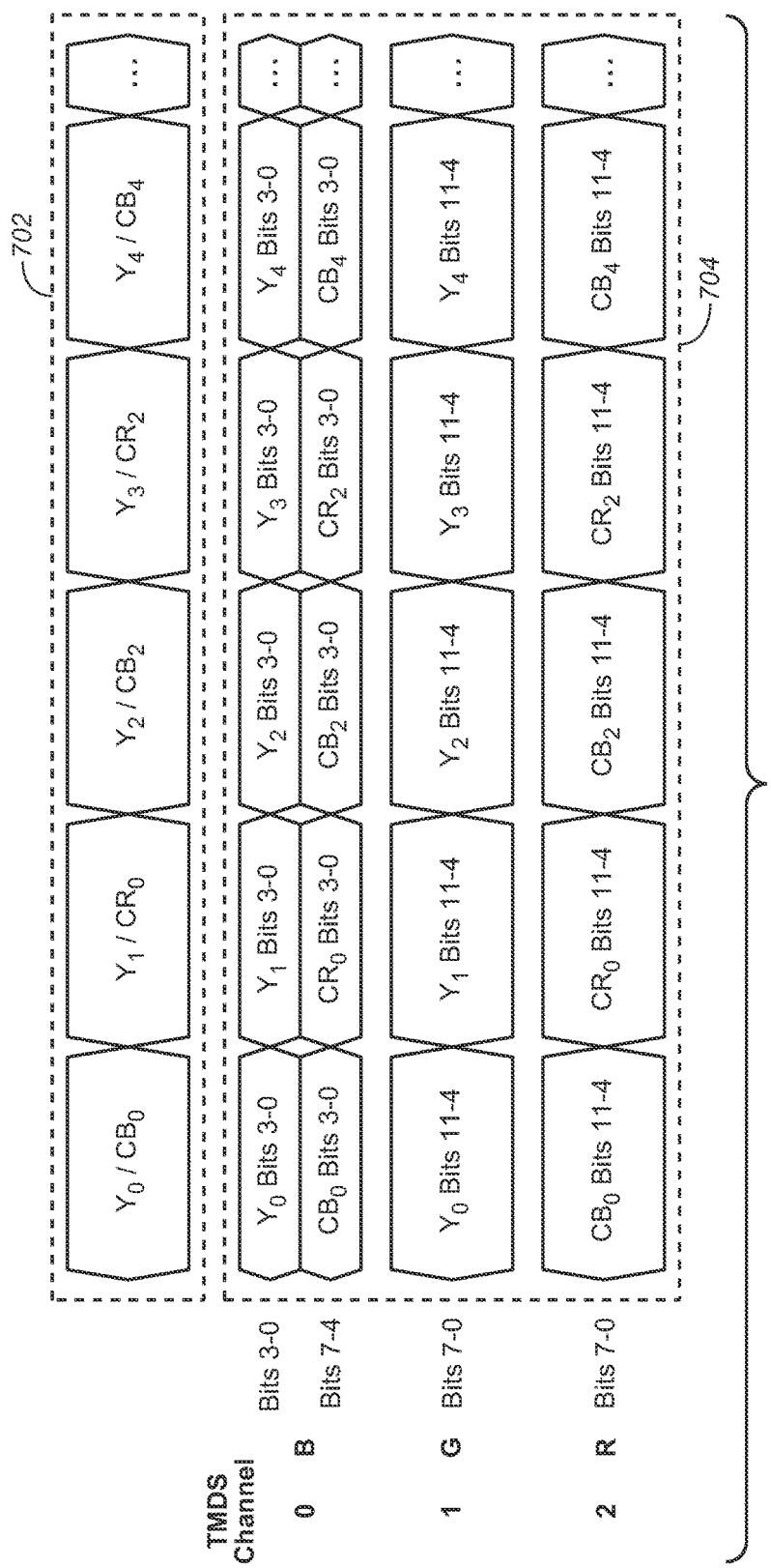
FIG. 7 illustrates example video signal formats.

FIG. 7 illustrates an example 8-bit RGB format (the second video signal format in the present example) that may be used to carry reference code values and DM metadata encoded in a 12-bit YCbCr 4:2:2 format (the first video signal format in the present example).

In some embodiments, the source system (602) first encodes, stores, etc., the reference code values in a first video signal (702) in the 12-bit YCbCr 4:2:2 format. One or more of operations such as color space conversion, mapping, inverse mapping, quantization, dequantization, downsampling, upsampling, etc., may be performed as a part of encoding, storing, etc., the reference code values into the first video signal (702) of the 12-bit YCbCr 4:2:2 format.

Additionally, optionally, or alternatively, in some embodiments, the source system (602) encodes, stores, etc., the DM metadata in the same first video signal (702) of the 12-bit YCbCr 4:2:2 format along with the reference code values. The source system (602) may be configured to scramble the DM metadata and store the scrambled DM metadata at locations in the first video signal (702) that are designated (e.g., by a video signal standard, etc.) for carrying the least-significant bit values of chroma or color channel pixel values. In the present example, reference code values may comprise luminance-related reference code values and chroma-related reference code values. The luminance channel of the first video signal (702) of the 12-bit YCbCr 4:2:2 format may store the luminance related reference code values, which a recipient display device can map to device-specific luminance values based on mapping functions, mapping curves, etc., at least partly constructed using the DM metadata. The chroma channels of the first video signal (702) of the 12-bit YCbCr 4:2:2 format may store the chroma related reference code values and the scrambled DM metadata. The scrambled DM metadata may be stored in locations—in the chroma channels of the first video signal (702)—that are designated (e.g., by the video signal standard, etc.) for storing the least-significant bit values of chroma or color channel pixel values.

In some embodiments, the source system (602) is configured to map the first video signal (702) of the 12-bit YCbCr 4:2:2 format into a second video signal (704) of the 8-bit RGB 4:4:4 format.

In an example embodiment as illustrated in FIG. 7, each luminance channel (e.g., 12 bit, etc.) sample (e.g., "$Y_0$", "$Y_1$", "$Y_2$", "$Y_3$", "$Y_4$", etc.) of the first video signal (702) of the 12-bit YCbCr 4:2:2 format may be split into a first sample portion (e.g., bits 3-0, etc.) and a second sample portion (e.g., bits 11-4, etc.). The first sample portion (e.g., bits 3-0, etc.) may be stored in a first part of the blue channel (e.g., "B", etc.) of the second video signal (704) of the 8-bit RGB 4:4:4 format. The second sample portion (e.g., bits 11-4, etc.) may be stored in the green channel (e.g., "G", etc.) of the second video signal (704) of the 8-bit RGB 4:4:4 format.

Each (e.g., sub-sampled, etc.) CB chroma channel sample (e.g., "$CB_0$", "$CB_2$", "$CB_4$", etc.) of the first video signal (702) of the 12-bit YCbCr 4:2:2 format may also be split into a first sample portion (e.g., bits 3-0, etc.) and a second sample portion (e.g., bits 11-4, etc.). The first sample portion (e.g., bits 3-0, etc.) may be stored in a second part of the blue channel (e.g., "B", etc.) of the second video signal (704) of the 8-bit RGB 4:4:4 format. The second sample portion (e.g., bits 11-4, etc.) may be stored in the red channel (e.g., "R", etc.) of the second video signal (704) of the 8-bit RGB 4:4:4 format.

Similarly, each (e.g., sub-sampled, etc.) CR chroma channel sample (e.g., "$CR_0$", "$CR_2$", etc.) of the first video signal (702) of the 12-bit YCbCr 4:2:2 format may be split into a first sample portion (e.g., bits 3-0, etc.) and a second sample portion (e.g., bits 11-4, etc.). The first sample portion (e.g., bits 3-0, etc.) may be stored in a second part of the blue channel (e.g., "B", etc.) of the second video signal (704) of the 8-bit RGB 4:4:4 format. The second sample portion (e.g., bits 11-4, etc.) may be stored in the red channel (e.g., "R", etc.) of the second video signal (704) of the 8-bit RGB 4:4:4 format.

As illustrated in FIG. 7, the CB samples (e.g., "$CB_0$", "$CB_2$", "$CB_4$", etc.) are interleaved with the CR samples (e.g., "$CR_0$", "$CR_2$", etc.) in the second video signal (704) of the 8-bit RGB 4:4:4 format, as in the first video signal (702) of the 12-bit YCbCr 4:2:2 format.

In an embodiment, the source system (602) then transmits the first video signal (702) of the 12-bit YCbCr 4:2:2 format in the second video signal (704) of the 8-bit RGB 4:4:4 format in a transmission mode (which may be referred to as "tunnel mode"). In contrast, transmission of the first video signal (702) of the 12-bit YCbCr 4:2:2 format from a source system to a sink system without mapping the first video signal (702) to another video signal format such as the 8-bit RGB 4:4:4 format is in a transmission mode which may be referred to as "normal mode."

In some embodiments, the source system (602) is configured to signal to the sink system (604) which transmission mode is being used in the communication path (606). For example, the source system (602) can set one or more indicators, one or more flags, data fields (e.g., Y0, Y1, etc.), etc., in a widely implemented standard-based metadata information frame (e.g., HDMI Auxiliary Video Information (AVI) InfoFrame, etc.) to specific values (e.g., Y0=0, Y1=0, etc.). The source system (602) can send one or more data packets comprising the standard-based metadata information frame to the sink system (604) to signal that the communication path (606) is operating in the tunnel mode.

In some embodiments, the sink system (604) is configured to detect which transmission mode is being used in the communication path (606). For example, the sink system (604) can receive the one or more data packets, read the one or more indicators, one or more flags, data fields (e.g., Y0, Y1, etc.), etc., in the standard-based metadata information frame (e.g., HDMI AVI InfoFrame, etc.) in the one or more data packets, etc. The sink system (604) can determine whether the communication path (606) is operating in the tunnel mode by determining whether the specific values (e.g., Y0=0, Y1=0, etc.) are in the one or more indicators, one or more flags, data fields (e.g., Y0, Y1, etc.), etc., in the standard-based metadata information frame (e.g., HDMI AVI InfoFrame, etc.).

In some embodiments, in response to determining that the communication path (606) is operating in the tunnel mode, the sink system (604) can map the second video signal (704) of the 8-bit RGB 4:4:4 format as received in the communication path (606) back to the first video signal (702) of the 12-bit YCbCr 4:2:2 format, extract the reference code values and the DM metadata from the 12-bit YCbCr 4:2:2 format, etc. The mapping from the 8-bit RGB 4:4:4 format to the 12-bit YCbCr 4:2:2 format may be performed, for example, with separate frame buffers for the first video signal (702) and the second video signal (704), with one or more data pointers that point to byte or bit locations in one or more of the 8-bit RGB 4:4:4 format or the 12-bit YCbCr 4:2:2 format, etc.

In some embodiments, the sink system (604) can descramble the DM metadata, perform display management operations on the reference code values based on the (e.g., descrambled, etc.) DM metadata, etc.

8. No Explicit Signaling Between Source and Sink

In some embodiments, a source system and a sink system, as described herein, perform one or more (e.g., standard-based, proprietary, etc.) handshake protocols to determine whether a communication path is to carry a video signal encoded with reference code values and DM metadata as described herein. The source system and the sink system may exchange protocol messages of the one or more handshake protocols using a metadata delivery mechanism (e.g., standard-based metadata delivery mechanism, proprietary delivery mechanism, etc.) that can be used to exchange capability information in initial hot plug signals, select a mutually supported video frame and/or video timing, etc. For example, the sink system may identify itself as enabled to process reference code values and DM metadata as described herein via a vendor-specific data-block (VSDB) sent from the sink system to the source system using the metadata delivery mechanism. The source system, on the other hand, may specify that the communication path is to carry reference code values and DM metadata as described herein via a vendor-specific information frame or InfoFrame (VSIF) sent from the source system to the sink system using the metadata delivery mechanism.

Such a metadata delivery mechanism may not be available in all video playback environments. For example, an AVR (e.g., a legacy device, etc.) in between the source system and the sink system may not support such a metadata delivery mechanism.

FIG. 6B illustrates a system configuration in which a communication path (e.g., 606, etc.) between a source system (e.g., 602, etc.) and a sink system (e.g., 604, etc.) is relayed via one or more third devices (e.g., 608, etc.) such as an audio video receiver (AVR), etc.; the communication path (606) comprises more than one communication links (e.g., 610-1, 610-2, etc.). The source system (602) may implement some or all of components in a media source system (100) of FIG. 1. The sink system (604) may implement some or all of components in a media sink system (200) of FIG. 2.

In some embodiments, at least one of the one or more third devices (608) that relays communication between the source system (602) and the sink system (604) does not support a metadata delivery mechanism (e.g., standard-based metadata delivery mechanism, proprietary delivery mechanism, etc.) that can be used to exchange capability information in initial hot plug signals, select a mutually supported video frame and/or video timing, etc. This may be the case, for instance, when an AVR in the communication path (606) drops protocol packets (e.g., HDMI Vendor Specific InfoFrame packets, etc.); when the source system (602) does not allow setting a flag (e.g., an EDR_Valid bit in a HDMI Vendor Specific InfoFrame, etc.); etc.

In some embodiments, the sink system (604) implements techniques as described herein to perform specific display management operations based on reference code values and DM data as received from the source system (602), even if a metadata delivery mechanism that allows the source system (602) and the sink system (604) to exchange capability information in initial hot plug signals, select a mutually supported video frame and/or video timing, etc., may or may not be available through the communication path (606). In some embodiments, the source system (602) implements techniques as described herein to detect whether a sink system is capable of performing specific display operations based on reference code values and DM data as received from the source system (602).

In some embodiments, once the source system (602) decides to start sending reference code values and DM metadata as described herein, the source system (602) embeds the DM metadata to a frame buffer (e.g., 12-bit YCbCr 4:2:2 video buffer, etc.) corresponding to a first video signal format (e.g., 12-bit YCbCr 4:2:2 format, etc.). In some embodiments, the source system (602) transmits the content of the frame buffer in the normal mode in which the content of the frame buffer, corresponding to the first video signal format, is transported in a first video signal of the first video signal format to the sink system (604). In some embodiments, the source system (602) transmits the content of the frame buffer in the tunnel mode in which the content of the frame buffer, corresponding to the first video signal format, is mapped to a second video signal format (e.g., 8-bit RGB 4:4:4 format, etc.). The mapped content in the second video signal format is transported in a second video signal of the second video signal format to the sink system (604).

In some embodiments, the source system (602) computes one or more CRC values (e.g., CRC-32 values, etc.) over some or all of bit values of the DM metadata, scrambles the DM metadata to be transmitted to the sink system (604) (e.g., in some least-significant bit values of chroma or color channel pixel values, etc.), transmits the CRC values to the sink system (604) as a part of, or in conjunction with, the DM metadata, etc.

In some embodiments, the sink system (604) is set in a ready state—for example, with respect to an HDMI receiver interface—to determine whether a video signal is carrying reference code values and DM metadata as described herein.

In some embodiments, the sink system (604) determines whether the communication path (606) is operating in the tunnel mode. For example, the sink system (604) determines whether specific values (e.g., Y0=0, Y1=0, etc.) are in one or more indicators, one or more flags, data fields (e.g., Y0, Y1, etc.), etc., in a (e.g., standard-based, etc.) metadata information frame (e.g., HDMI AVI InfoFrame, etc.). If so, the sink system (604) determines that the communication path (606) is operating in the tunnel mode in which the source system (602) may possibly (e.g., pending further verification based on CRC values, etc.) store reference code values and DM metadata in a first video signal of a first video signal format, such as the 12-bit YCbCr 4:2:2 format, etc.; map the first video signal to a second video signal of a second video signal format, such as the 8-bit RGB 4:4:4 format, etc.; transmits the second video signal to the sink system (604) via the communication path (606); etc.

On the other hand, if it is determined that the specific values (e.g., Y0=0, Y1=0, etc.) are not in one or more indicators, one or more flags, data fields (e.g., Y0, Y1, etc.), etc., in a (e.g., standard-based, etc.) metadata information frame (e.g., HDMI AVI InfoFrame, etc.), the sink system (604) determines that the communication path (606) is operating in the normal mode in which the source system (602) may possibly (e.g., pending further verification based on CRC values, etc.) store reference code values and DM metadata in a first video signal of a first video signal format, such as the 12-bit YCbCr 4:2:2 format, etc.; transmits the first video signal to the sink system (604) via the communication path (606); etc.

In some embodiments, the sink system (604) sets an extraction mode corresponding to the mode (e.g., the normal mode, the tunnel mode, etc.) in which the communication path (606) is operating. In a first extraction mode that corresponds to the normal mode of the communication path (606), the sink system (604) is configured to extract a first data portion that possibly represents reference code values and a second data portion that possibly represents DM metadata from the video signal in the communication path (606) based on the first video signal format. In a second extraction mode that corresponds to the tunnel mode of the communication path (606), the sink system (604) is configured to map the video signal of the second video signal format in the communication path (606) to a mapped video signal in the first video signal format (e.g., with frame buffers, etc.); extract a first data portion that possibly represents reference code values and a second data portion that possibly represents DM metadata from the mapped video signal based on the first video signal format; etc.

In some embodiments, the sink system (602) computes one or more CRC values (e.g., CRC-32 values, etc.) over some or all of bit values of the second data portion that possibly represents DM metadata as descrambled from the received video signal, extracts one or more possible source CRC values from the received video signal, etc. The one or more possible source CRC values may possibly (e.g., pending further verification based on whether the possible source CRC values match the computed CRC values, etc.) be CRC values computed by the source system (602) and provided as a part of, or in conjunction, the DM metadata; etc.

In some embodiments, the sink system performs a CRC test, for example, by determining whether the one or more CRC values computed by the sink system match one or more of the extracted possible CRC values from the received video signal. The CRC test fails if it is determined that the one or more CRC values computed by the sink system do not match one or more of the extracted possible CRC values from the received video signal. On the other hand, the CRC test passes if it is determined that the one or more CRC values computed by the sink system match one or more of the extracted possible CRC values from the received video signal.

In response to a CRC test failure, the sink system (604) determines that the received video signal from the source system (602) does not carry reference code values and DM metadata as described herein, and does not go into a specific operational mode (e.g., an ERR operational mode, etc.) in which the sink system (604) performs display management operations with respect to reference code values and DM metadata as described herein.

On the other hand, in response to a CRC test pass, the sink system (604) determines that the received video signal from the source system (602) carries reference code values and DM metadata as described herein, goes into the specific operational mode that the sink system (604) performs display management operations with respect to reference code values and DM metadata as described herein.

In some embodiments, the sink system (604) stays in the specific operational mode as long as CRC tests keep passing. In some embodiments, the sink system (604) quits the specific operational mode when the total number of (e.g., consecutive, etc.) CRC test failures reaches above a certain threshold (e.g., CRC test fails for 12, 18, 24, 30, etc., consecutive video frames, etc.).

In some embodiments, in order to determine whether a received video signal carries reference code values and DM metadata as described herein, the sink system (604) implements a CRC test based method as discussed above, in addition to implementing a handshake protocol based method (e.g., based on an HDMI VSIF, etc.). One of these methods may take precedence over another of the methods. In some embodiments, the CRC test based method takes precedence over the handshake protocol based method. In some embodiments, the handshake protocol based method takes precedence over the CRC test based method.

9. Configuring Source for EDR Operation

In some embodiments, an HDMI Vendor Specific Data Block (VSDB) transmission from the sink system (604) may not be detectable to a source system (e.g., 602, etc.). Additionally, optionally, or alternatively, the source system (602) might not be configured to allow polling of one or more bits (e.g., a support_EDR bit in an HDMI Vendor Specific Data Block sent by a sink system, etc.) in a metadata packet or block to indicate support for performing specific display management operations based on reference code values and DM metadata as described herein.

Techniques as described herein can be implemented by a source system (e.g., 602, etc.) for determining whether a sink system (e.g., 604, etc.) that it is connected to the source system over a communication path (e.g., 606) is a device enabled for performing specific display operations related to reference code values and DM metadata, even if a metadata delivery mechanism that allows the source system and the sink system to exchange capability information in initial hot plug signals, select a mutually supported video frame and/or video timing, etc., may or may not be available in a specific video playback environment in which the source system and the sink system operate.

In some embodiments, the source system (602) stores a specific image pattern (e.g., one or more images, a time sequence of images, a still image, etc.) in a first video signal format, such as a 12-bit YCbCr 4:2:2 format, etc., in a frame buffer, in a data store, in a portion of memory space, etc.

In some embodiments, the source system (602) scrambles DM metadata in certain bit locations of the first video signal format (e.g., some LSB locations of chroma samples in video frames of the first video signal format, etc.).

In some embodiments, the source system (602) EDR source packs the specific image pattern (minus certain bit values in the bit locations that are used to store the DM metadata) and the DM metadata in an image container (e.g., a frame buffer, etc.) of a second video signal format such as an 8-bit RGB 4:4:4 format, etc.

In some embodiments, the source system (602) sets one or more indicators, one or more flags, data fields (e.g., Y0, Y1, etc.), etc., in a (e.g., standard-based, etc.) metadata information frame (e.g., HDMI AVI InfoFrame, etc.) to one or more specific values (e.g., Y0=0, Y1=0, etc.) to indicate that a video signal of the second video signal format is being sent over the communication path (606).

The sink system (604), if capable of performing specific display management operations with reference code values and DM metadata as described herein, may be configured to determine or assume—based at least in part on detecting the one or more specific values in the one or more indicators, one or more flags, data fields (e.g., Y0, Y1, etc.), etc., in the (e.g., standard-based, etc.) metadata information frame (e.g., HDMI AVI InfoFrame, etc.)—that the received video signal of the second video signal format carries a pre-mapped video signal of the first video signal format.

The sink system (604) can proceed to perform CRC tests in its DM metadata extraction operation. Further, the sink system (604) can extract reference code values and perform the specific display management operations with the reference code values and the DM metadata. Device-specific pixel values obtained from the specific display management operations may be used by the sink system (604) to render/display the specific image pattern as expected on a display that may be a part of the sink system (604) or operatively linked with the sink system (604).

However, sink systems (e.g., legacy displays, etc.) that do not implement the techniques as described herein would assume that the received video signal of the second video signal format carries pixel values (e.g., RGB pixel values, etc.) of the second video signal format (e.g., 8-bit RGB 4:4:4 format, etc.) and would decode the received video signal on that basis. Accordingly, the image rendered by such sink systems would show significant color distortions as compared with the specific image pattern or a rendered image by a sink system that does implement the techniques as described herein.

In some embodiments, the source system (602) is configured with one or more (e.g., over-the-top or OTT, set-top, etc.) applications that can interact with and receive input from a user. The source system (602) can ask the user (e.g., through a text message on the specific image pattern, etc.) whether an image pattern without the color distortion can be seen.

The source system (602) receives user input from the user (e.g., by pressing a button on a remote device or on the source system (602), etc.) to indicate whether the user sees the image pattern without the color distortion.

In response to receiving an indication (as determined from the user input) that the user sees the image pattern without the color distortion, the source system (602) determines that the sink system (604) connected in the communication path (606) is capable of performing specific display management operations with reference code values and DM metadata as described herein. The source system (602) accordingly proceeds to transmitting zero, one or more media programs (e.g., represented by reference code values and DM metadata as described herein, etc.) to the sink system (604) on that basis.

In response to receiving an indication (as determined from the user input) that the user does not see the image pattern without the color distortion, the source system (602) determines that the sink system (604) connected in the communication path (606) is incapable of performing specific display management operations with reference code values and DM metadata as described herein and proceeds or switches to transmitting zero, one or more media programs (e.g., represented by pixel values other than reference code values and DM metadata as described herein, SDR pixel values, RGB pixel values, etc.) to the sink system (604) on that basis.

In some embodiments, this EDR sink system detection method is implemented by a source system that may not support receiving, or polling specific bits from, a metadata information frame (e.g., HDMI Vendor Specific Data Block, etc.) that indicates whether a sink system is capable of performing specific display management operations with reference code values and DM metadata as described herein. In some embodiments, this EDR sink system detection method is implemented by a source system that supports receiving, or polling specific bits from, a metadata information frame (e.g., HDMI Vendor Specific Data Block, etc.) that indicates whether a sink system is capable of performing specific display management operations with reference code values and DM metadata as described herein; in these embodiments, the method of polling the specific bits of the metadata information frame may take precedence over the HDMI VSDB shall be implemented and take precedence over the EDR sink system detection method that is in part based on user input. Note that in some embodiments, the polling method may not be possible in certain playback environments as there may exist one or more constraints such as one or more legacy intermediate devices (e.g., a legacy AVR, etc.) that do not support end-to-end signaling for determining EDR capabilities based on a metadata information frame between a source system and a sink system, even if one or both of the source system and the sink system may or may not be capable of polling these bits in the metadata information frame.

The specific image pattern chosen for signaling can be quite arbitrary as long as visual differences are clearly noticed. For example, the specific image pattern may be represented by a grey frame in an YCbCr color space. Such a grey frame mapped from a 12-bit YCbCr color space to an 8-bit RGB format—for example, in accordance with FIG. 7—does not create a grey frame in an RGB space, and instead would create some color. Therefore, a text message, for example, in black or white, can be used in the specific image pattern to ask whether the user sees "any" color other than grey in pixels surrounding the text message. If the user answers "No", then the specific image pattern has been detected accurately by a sink system capable of performing specific display management operations with reference code values and DM metadata as described herein. Otherwise, the sink system is a legacy device that is incapable of performing specific display management operations with reference code values and DM metadata as described herein.

10. Example Process Flow

Figure 4:
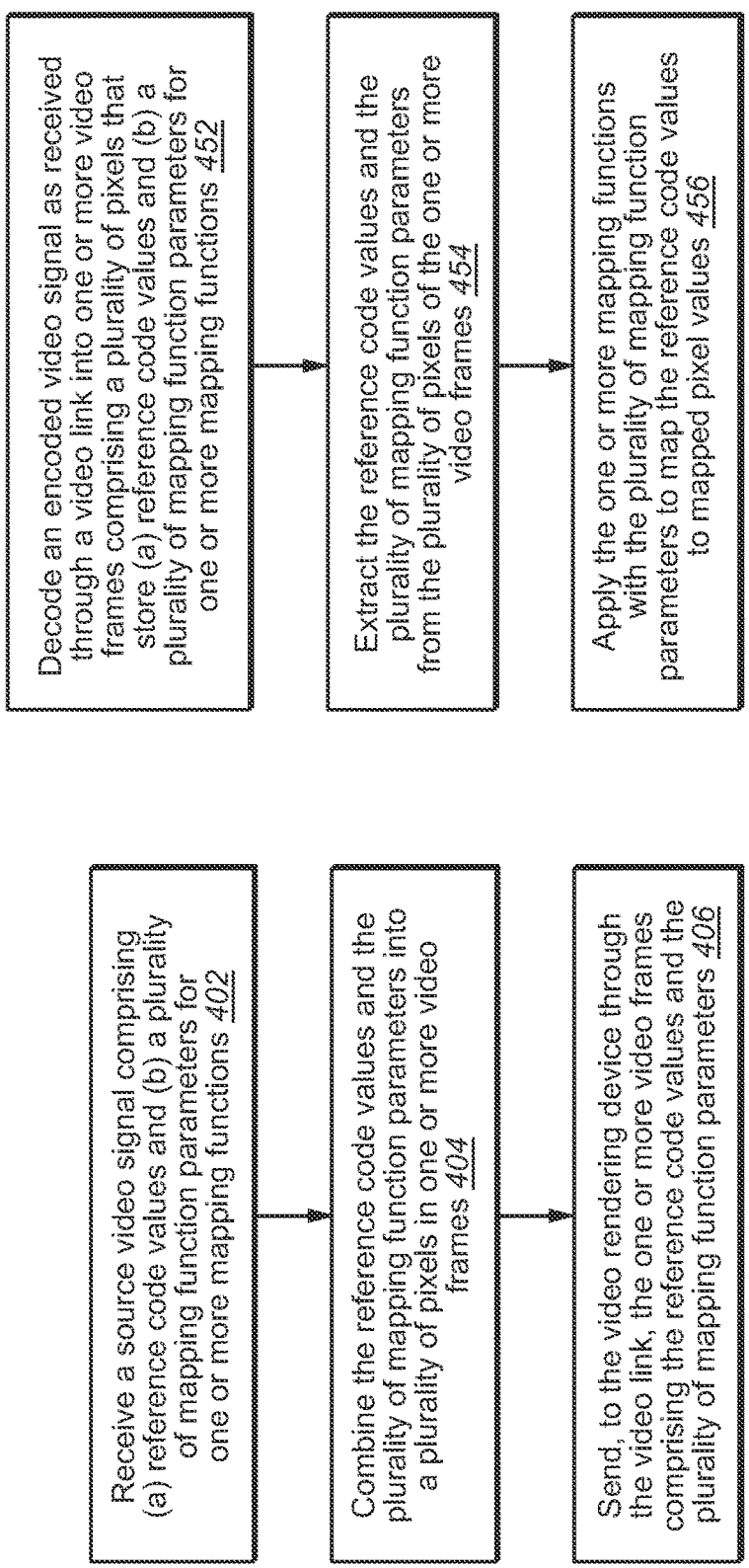
FIG. 4A and FIG. 4B illustrate example process flows.

FIG. 4A and FIG. 4B illustrate example process flows. In some embodiments, one or more computing devices or units (e.g., a Media Source System 100 of FIG. 1, a Media Sink System 200 of FIG. 2, etc.) may perform the process flows.

In block 402, a Media Source system (e.g., 100 of FIG. 1, etc.) receives a source video signal comprising (a) reference code values and (b) a plurality of mapping function parameters for one or more mapping functions. The one or more mapping functions with the plurality of mapping function parameters can be used to map the reference code values to mapped pixel values specific to a video rendering device.

In block 404, the Media Source system (100) combines the reference code values and the plurality of mapping function parameters into a plurality of pixels in one or more video frames. Here, the plurality of pixels is specifically designated by one or more video link standards governing a video link to the video rendering device to carry only pixel values.

In block 404, the Media Source system (100) sends, to the video rendering device through the video link, the one or more video frames comprising the reference code values and the plurality of mapping function parameters.

In an embodiment, the Media Source system (100) is configured to determine that the video rendering device is capable of performing mapping operations related to the one or more mapping functions.

In block 452, a Media Sink system (e.g., 200 of FIG. 2, etc.) decodes an encoded video signal (e.g., 112 of FIG. 2, etc.) as received through a video link into one or more video frames comprising a plurality of pixels that store (a) reference code values and (b) a plurality of mapping function parameters for one or more mapping functions. The plurality of pixels are specifically designated by one or more video link standards governing the video link to carry only pixel values.

In block 454, the Media Sink system (200) extracts the reference code values and the plurality of mapping function parameters from the plurality of pixels of the one or more video frames.

In block 456, the Media Sink system (200) applies the one or more mapping functions with the plurality of mapping function parameters to map the reference code values to mapped pixel values.

In an embodiment, the Media Sink system (200) is further configured to indicate that a video sink system is capable of performing mapping operations related to the one or more mapping functions, wherein the method is performed by the video sink system.

In an embodiment, the video link is one of a High-Definition Multimedia Interface (HDMI) link, V-by-One-HS (V×1) link, a Low-Voltage Differential Signaling (LVDS) link, a High Definition Serial Digital Interface (HD-SDI) link, etc.

In an embodiment, the plurality of mapping function parameters and the reference code values are in the same video frame of the one or more video frames.

In an embodiment, the one or more video frames represents a part of a time sequence of video frames; the plurality of mapping function parameters is in a first video frame of the one or more video frames; and the reference code values are in a second video frame before the first video frame in the time sequence.

In an embodiment, the plurality of mapping function parameters is stored in a plurality of least significant bit fields in the bit fields of the plurality of pixels.

In an embodiment, the plurality of mapping function parameters is stored in a plurality of bit fields in the plurality of pixels; bits fields, other than the plurality of bit fields, in the plurality of pixels carry component reference code values for each channel in a set of channels of a color space; and the plurality of bit fields is originally designated by the video link standards governing the video link to component pixel values for a proper subset of channels in the set of channels of the color space.

In an embodiment, the set of channels of the color space comprises at least one chroma component; and the proper subset of channels comprises the at least one chroma components in the set of channels of the color space.

In an embodiment, the color space is one of RGB color spaces, or YCbCr color spaces.

In an embodiment, the source video signal is in source media data comprising one of: video content only, or both audio content and video content. The media data can be received in one of an over-the-air broadcast signal, a cable broadcast signal, a satellite broadcast signal, a media data bitstream, a media data file, etc.

In an embodiment, the one or more video frames form a scene.

In an embodiment, the one or more video frames is in one of a 4-4-4 sampling format, a 4-2-2 sampling format, a 4-2-0 sampling format, etc.

In an embodiment, one or more mapping function parameters in the plurality of mapping function parameters are repeated in the one or more video frames.

In an embodiment, the plurality of mapping function parameters is sent to the video rendering device in payloads of DM metadata transmission packets along with one or more cyclic redundancy check (CRC) values computed from a portion of bit values of the DM metadata transmission packets.

In an embodiment, a video frame in the one or more video frames carries the plurality of mapping function parameters used to perform mapping operations related to the one or more mapping functions on the same video frame.

In an embodiment, a video frame in the one or more video frames does not carry the plurality of mapping function parameters, wherein the video frame comprises a value representing a flag to indicate that the plurality of mapping function parameters previously received should be used to perform mapping operations related to the one or more mapping function on the same video frame.

In an embodiment, mapping operations related to the one or more mapping functions comprise one or more of tone mapping operation, color gamut mapping operations, etc.

In an embodiment, a plurality of bit fields—in the plurality of pixels—that stores the plurality of mapping function parameters is scrambled.

In an embodiment, the plurality of pixels carries additional non-pixel values; and the non-pixel values store one or more operational parameters for display management operations other than mapping operations related to the plurality of mapping function parameters.

FIG. 8A through FIG. 8D illustrate additional example process flows. In some embodiments, one or more computing devices or units (e.g., a Media Source System 100 of FIG. 1, a Media Sink System 200 of FIG. 2, a source system 602 of FIG. 6A or FIG. 6B, a sink system 604 of FIG. 6A or FIG. 6B, etc.) may perform the process flows.

FIG. 8A illustrates example process flow of transmitting a video signal format used to carry reference code values and DM data as described herein in another video signal format supported in a specific playback environment. In block 802, a source system (e.g., 602 of FIG. 6A or FIG. 6B, etc.) receives a source video signal comprising (a) reference code values and (b) a plurality of mapping function parameters for one or more mapping functions. The one or more mapping functions with the plurality of mapping function parameters may be used to map the reference code values to device-specific pixel values.

In block 804, the source system (602) combines one or more portions of the reference code values and the plurality of mapping function parameters into one or more first video frames in a first video signal format.

In block 806, the source system (602) generates one or more second video frames in a second video signal format based on the one or more first video frames in the first video signal format and a mapping between the first video signal format and the second video format.

In block 808, the source system (602) sends, to a video sink device through the video link, the one or more second video frames.

In an embodiment, the first video signal format represents a 12-bit YCbCr format, whereas the second video signal format represents an 8-bit RGB format.

In an embodiment, the source system (602) is further configured to transmit a metadata information frame with data indicating that an underlying video signal of the first video signal format is being carried in the encoded video signal of the second video signal format.

In an embodiment, the source system (602) is further configured to perform: computing one or more cyclic redundancy check (CRC) values over bit values of one or more portions of the DM metadata in the one or more first video frames; and transmitting the one or more CRC values in the one or more first video frames with the DM metadata.

In an embodiment, the source system (602) is further configured to determine that the video sink device is capable of performing mapping operations related to the one or more mapping functions.

In an embodiment, the video link is one of: a High-Definition Multimedia Interface (HDMI) link, V-by-One-HS (V×1) link, a Low-Voltage Differential Signaling (LVDS) link, a High Definition Serial Digital Interface (HD-SDI) link, etc.

In an embodiment, the plurality of mapping function parameters is stored in a plurality of least significant bit fields in the one or more first video frames. In an embodiment, one or more mapping function parameters in the plurality of mapping function parameters are repeated in the one or more first video frames.

In an embodiment, the one or more first video frames form a scene. In an embodiment, a video frame in the one or more video frames carries the plurality of mapping function parameters used to perform mapping operations related to the one or more mapping functions on the same video frame. In an embodiment, a first video frame in the one or more first video frames does not carry the plurality of mapping function parameters; the first video frame comprises a value representing a flag to indicate that the plurality of mapping function parameters previously received is to be used to perform mapping operations related to the one or more mapping function on the same first video frame.

In an embodiment, mapping operations related to the one or more mapping functions comprise one or more of tone mapping operation or color gamut mapping operation. In an embodiment, a plurality of bit fields, in the one or more first video frames, that stores the plurality of mapping function parameters is scrambled. In an embodiment, the one or more first video frames further carry one or more parameters for display management operations other than the mapping.

FIG. 8B illustrates example process flow of decoding a video signal format that is used to tunnel a video signal of another video signal format, wherein reference code values and DM data as described herein in a specific playback environment are first encoded in the other video signal format. In block 822, a sink system (e.g., 604 of FIG. 6A or FIG. 6B, etc.) receives an encoded video signal through a video link. Here, one or more portions of reference code values and a plurality of mapping function parameters may be combined into one or more first video frames in a first video signal format. The encoded video signal comprising one or more second video frames in a second video signal format. The one or more second video frames are generated based on the one or more first video frames in the first video signal format and a mapping between the first video signal format and the second video format.

In block 824, the sink system (604) extracts the one or more second video frames in the second video signal format from the encoded video signal.

In block 826, the sink system (604) extracts the one or more portions of the reference code values and the plurality of mapping function parameters based on the one or more first video frames and a mapping between the first video signal format and the second video format; and In block 828, the sink system (604) applies the one or more mapping functions with the plurality of mapping function parameters to map the one or more portions of reference code values to mapped pixel values.

In an embodiment, the sink system (604) is further configured to receive a metadata information frame with data indicating that an underlying video signal of the first video signal format is being carried in the encoded video signal of the second video signal format.

In an embodiment, the sink system (604) is further configured to render one or more images constructed based on the one or more portions of the reference code values and the plurality of mapping function parameters.

FIG. 8C illustrates example process flow of determining the existence of a video signal format that is used to tunnel a video signal of another video signal format, wherein reference code values and DM data as described herein in a specific playback environment are first encoded in the other video signal format. In block 842, a sink system (e.g., 604 of FIG. 6A or FIG. 6B, etc.) extracts a specific data portion from one or more video frames encoded in an encoded video signal. The encoded video signal is received from a video receiver interface of the sink system (604).

In block 844, the sink system (604) performs a CRC test on the specific data portion extracted from the encoded video signal.

In block 846, in response to a success of the CRC test on the specific data portion extracted from the encoded video signal, the sink system (604) sets the video sink system in a specific operational mode in which the video sink system maps, based at least in part on a plurality of mapping function parameters carried in the specific data portion extracted from the encoded video signal, a plurality of reference code values extracted from the encoded video signal to device-specific pixel values.

In an embodiment, the sink system (604) is further configured to perform: extracting one or more source-device computed cyclic redundancy check (CRC) values from the one or more first video frames; computing one or more CRC values over bit values of one or more specific portions of the one or more first video frames; and comparing the one or more CRC values with the one or more source-device computed CRC values.

In an embodiment, the sink system (604) is further configured to set, in response to a specified number of failures of the CRC tests on specific data portions extracted from the encoded video signal, the video sink system in a second specific operational mode in which the video sink system does not perform mapping of reference code values to device-specific pixel values.

In an embodiment, the video sink system is prevented from receiving a metadata information frame with data indicating that the encoded video signal comprise reference code values and mapping function parameters used to map the reference code values to device-specific pixel values.

In an embodiment, the encoded video signal is of a first video signal format and comprises video frames in the first video signal format in which reference code values and mapping function parameters used to map the reference code values to device-specific pixel values are encoded.

In an embodiment, the encoded video signal comprises video frames of a video signal format into which first video frames in a first video signal format different from the video signal format are mapped; and reference code values and mapping function parameters used to map the reference code values to device-specific pixel values are encoded in the first video frames.

FIG. 8D illustrates example process flow of determining whether a sink system is capable of performing display management operations based on reference code values and DM data as described herein in a specific playback environment. In block 862, a source system (e.g., 602 of FIG. 6A or FIG. 6B, etc.) combines a plurality of reference code values and a plurality of mapping function parameters into one or more first video frames in a first video signal format. The plurality of reference code values represents a specific image pattern. The plurality of mapping function parameters relates to one or more mapping functions to map the plurality of reference code values to a plurality of device-specific pixel values.

In block 864, the source system (602) generates one or more second video frames in a second video signal format based on the one or more first video frames in the first video signal format and a mapping between the first video signal format and the second video format.

In block 866, the source system (602) sends to a video sink system through a video link, the one or more second video frames;

In block 868, in response to receiving user input indicating that the specific image pattern without color distortion is displayed with the video sink system, the source system (602) sets a video source system in a specific operational mode in which the video source system sends to the video sink system additional video frames encoded with reference code values and mapping function parameters that are used to map the reference code values to device-specific pixel values, the reference code values in the additional video frames representing at least a portion of video content of one or more media programs.

In an embodiment, the specific image pattern is a grayscale image pattern stored at the video sink system.

In an embodiment, the source system (602) is further configured to set, in response to receiving user input indicating that the specific image pattern with color distortion is displayed with the video sink system, a video source system in a second specific operational mode in which the video source system sends to the video sink system additional video frames without reference code values and mapping function parameters to map the reference code values to device-specific pixel values.

Embodiments include, a media processing system configured to perform any one of the methods as described herein.

Embodiments include an apparatus comprising a processor and configured to perform any one of the foregoing methods.

Embodiments include a non-transitory computer readable storage medium, storing software instructions, which when executed by one or more processors cause performance of any one of the foregoing methods.

Note that, although separate embodiments are discussed herein, any combination of embodiments and/or partial embodiments discussed herein may be combined to form further embodiments.

11. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
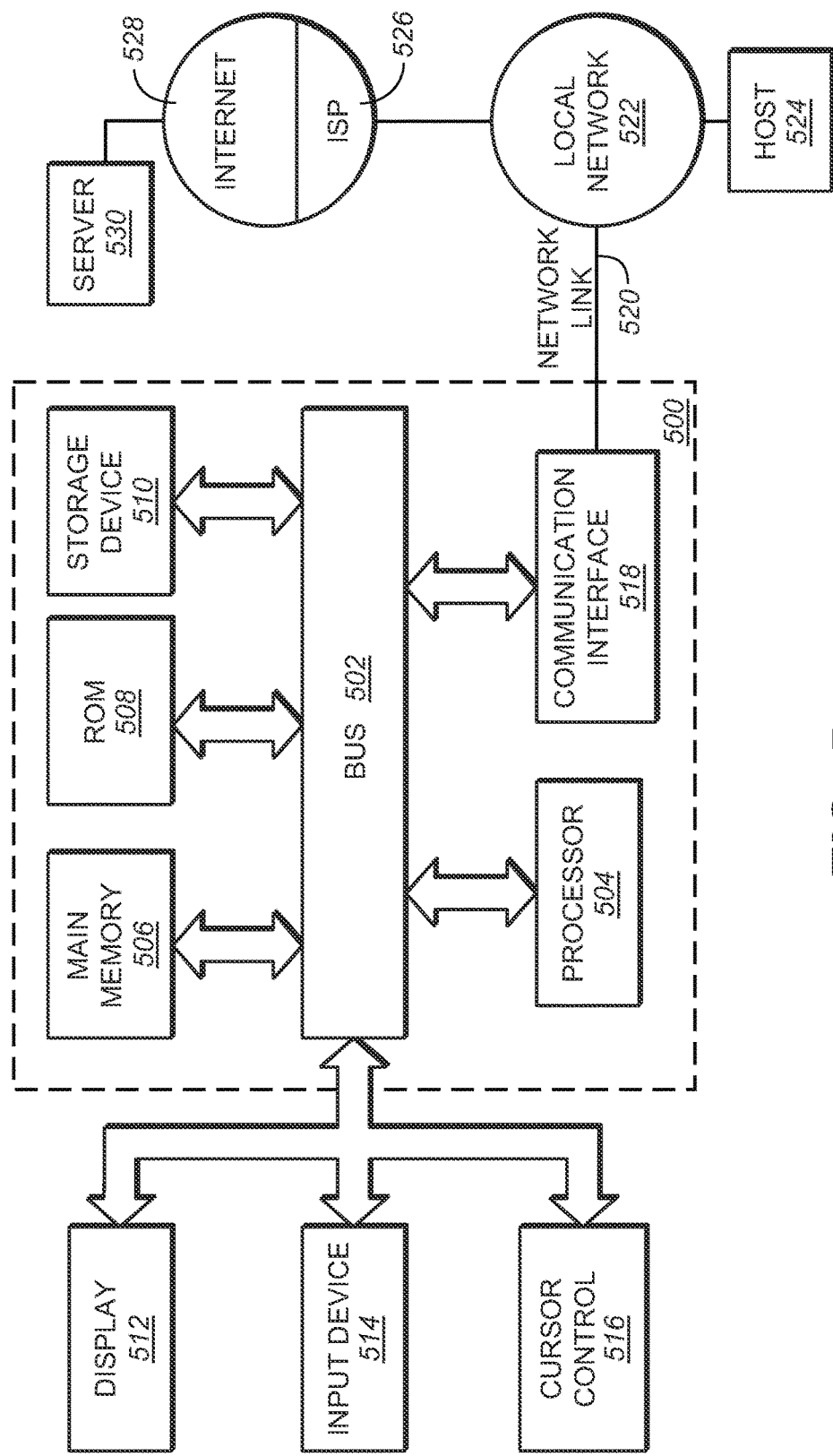
FIG. 5 illustrates an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is device-specific to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using device-specific hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hardwired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

12. Equivalents, Extensions, Alternatives and Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for transmitting a video signal from a video source system to a video sink system via a video signal communication path, comprising:

the video source system receiving a source video signal comprising (a) reference code values and (b) a plurality of mapping function parameters for one or more mapping functions, the one or more mapping functions with the plurality of mapping function parameters mapping the reference code values to device-specific pixel values;

the video source system combining (a) one or more portions of the reference code values and (b) the plurality of mapping function parameters into one or more first video frames in a first video signal format, the plurality of mapping function parameters representing at least a portion of display management (DM) metadata carried in the one or more first video frames in the first video signal format;

the video source system signaling the video sink system which transmission mode among a first mode and a second mode is being used respectively corresponding to whether the video signal communication path does or does not support transporting the video signal in the first video signal;

if the video signal communication path does not support transporting the video signal in the first video signal format:

generating one or more second video frames in a second video signal format based on the one or more first video frames in the first video signal format and a mapping between the first video signal format and the second video signal format; and the video source system sending to the video sink system via the video signal communication path, the one or more second video frames in an encoded video signal of the second video signal format;

if the video signal communication path does support transporting the video signal in the first video signal format:

the video source system sending to the video sink system via the video signal communication path, the one or more first video frames in an encoded video signal of the first video signal format.

2. The method as recited in claim 1, wherein the first video signal format represents an YCbCr format, and wherein the second video signal format represents an RGB format.

3. The method as recited in claim 1, further comprising transmitting a metadata information frame with data indicating that an underlying video signal of the first video signal format is being carried in the encoded video signal of the second video signal format.

4. The method as recited in claim 1, further comprising:
computing one or more cyclic redundancy check (CRC) values over bit values of one or more portions of the DM metadata in the one or more first video frames; and
transmitting the one or more CRC values in the one or more first video frames with the DM metadata.

5. The method as recited in claim 1, further comprising determining that the video sink system is capable of performing mapping operations related to the one or more mapping functions.

6. The method as recited in claim 1, wherein the video link is one of: a High-Definition Multimedia Interface (HDMI) link, V-by-One-HS (V×1) link, a Low-Voltage Differential Signaling (LVDS) link, or a High Definition Serial Digital Interface (HD-SDI) link.

7. The method as recited in claim 1, wherein the plurality of mapping function parameters is stored in a plurality of least significant bit fields in the one or more first video frames.

8. The method as recited in claim 1, wherein the one or more first video frames form a scene.

9. The method as recited in claim 1, wherein one or more mapping function parameters in the plurality of mapping function parameters are repeated in the one or more first video frames.

10. The method as recited in claim 1, wherein a video frame in the one or more video frames carries the plurality of mapping function parameters used to perform mapping operations related to the one or more mapping functions on the same video frame.

11. The method as recited in claim 1, wherein a first video frame in the one or more first video frames does not carry the plurality of mapping function parameters, and wherein the first video frame comprises a value representing a flag to indicate that the plurality of mapping function parameters previously received is to be used to perform mapping operations related to the one or more mapping function on the same first video frame.

12. The method as recited in claim 1, wherein mapping operations related to the one or more mapping functions comprise one or more of tone mapping operation or color gamut mapping operation.

13. The method as recited in claim 1, wherein a plurality of bit fields, in the one or more first video frames, that stores the plurality of mapping function parameters is scrambled.

14. The method as recited in claim 1, wherein the one or more first video frames further carry one or more parameters for display management operations other than the mapping.

15. A method for receiving a video signal from a video source system by a video sink system via a video signal communication path, comprising:

the video sink system receiving a signaling from the video source system which transmission mode among a first mode and a second mode is being used respectively corresponding to whether the video signal communication path does or does not support transporting the video signal in a first video signal format;

the video sink system receiving, from the video source system, an encoded video signal via the video signal communication path;

in response to receiving a signaling that the second mode is used:

extracting one or more second video frames in a second video signal format from the encoded video signal;

extracting one or more first video frames in a first video signal format from the one or more second video frames based on a mapping between the first video signal format and the second video format;

extracting one or more portions of reference code values and a plurality of mapping function parameters from the one or more first video frames;

in response to receiving a signaling that the first mode is used:

extracting one or more first video frames in a first video signal format from the encoded video signal;

extracting one or more portions of reference code values and a plurality of mapping function parameters based on the one or more first video frames; and applying one or more mapping functions with the plurality of mapping function parameters to map the one or more portions of reference code values to mapped device-specific pixel values.

16. The method as recited in claim 15, further comprising receiving a metadata information frame with data indicating that an underlying video signal of the first video signal format is being carried in the encoded video signal of the second video signal format.

17. The method as recited in claim 15, further comprising rendering one or more images that are constructed based on the one or more portions of the reference code values and the plurality of mapping function parameters.

18. The method as recited in claim 15, further comprising:
extracting, by the video sink system, a specific data portion from said one or more video frames in the first video signal format;
performing, by the video sink system, a cyclic redundancy check (CRC) test on the specific extracted data portion;
wherein said applying the one or more mapping functions with the plurality of mapping function parameters to map the one or more portions of reference code values to mapped pixel values is performed only in response to a success of the CRC test on the specific extracted data portion.

19. The method as recited in claim 18, further comprising:
extracting one or more source-device computed cyclic redundancy check (CRC) values from the one or more first video frames;
computing one or more CRC values over bit values of one or more specific portions of the one or more first video frames; and
comparing the one or more CRC values with the one or more source-device computed CRC values.

20. The method as recited in claim 18, further comprising in response to a specified number of failures of the CRC tests on specific data portions extracted from the encoded video signal, setting the video sink system in a second specific operational mode in which the video sink system does not perform mapping of reference code values to device-specific pixel values.

21. The method as recited in claim 18, wherein the video sink system is prevented from receiving a metadata information frame with data indicating that the encoded video signal comprises reference code values and mapping function parameters used to map the reference code values to device-specific pixel values.

22. The method as recited in claim 18, wherein the encoded video signal is of a first video signal format and comprises video frames in the first video signal format in which reference code values and mapping function parameters used to map the reference code values to device-specific pixel values are encoded.

23. The method as recited in claim 18, wherein the encoded video signal comprises video frames of a video signal format into which first video frames in a first video signal format different from the video signal format are mapped; and wherein reference code values and mapping function parameters used to map the reference code values to device-specific pixel values are encoded in the first video frames.

24. The method of claim 1, further comprising:
the video source system storing a specific image pattern in said first video signal format;
combining a plurality of reference code values and said plurality of mapping function parameters into one or more first video frames in said first video signal format, the plurality of reference code values representing the specific image pattern;
generating one or more second video frames in said second video signal format based on the one or more first video frames in the first video signal format and a mapping between the first video signal format and the second video format;
sending to the video sink system via the video signal communication path, the one or more second video frames;
in response to receiving user input indicating that the specific image pattern without color distortion is displayed with the video sink system, setting the video source system in a specific operational mode in which the video source system performs said combining (a) one or more portions of the reference code values and (b) the plurality of mapping function parameters into one or more first video frames in a first video signal format.

* * * * *